US009927992B2

(12) United States Patent
Driesen et al.

(10) Patent No.: US 9,927,992 B2
(45) Date of Patent: Mar. 27, 2018

(54) SEGMENTED DATABASE MIGRATION

(71) Applicant: SAP SE, Walldorf (DE)

(72) Inventors: Volker Driesen, Heidelberg (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 14 days.

(21) Appl. No.: 15/242,053

(22) Filed: Aug. 19, 2016

(65) Prior Publication Data

US 2018/0052620 A1   Feb. 22, 2018

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0647* (2013.01)

(58) Field of Classification Search
CPC .... G06F 3/0617; G06F 3/0619; G06F 3/0646; G06F 3/0647; G06F 3/065; G06F 3/067; G06F 3/0683
USPC .................. 707/634, 654, 659; 711/162, 165
See application file for complete search history.

(56) References Cited

U.S. PATENT DOCUMENTS

| | | | |
|---|---|---|---|
| 8,914,340 B2* | 12/2014 | Ash | G06F 3/0611 |
| | | | 707/694 |
| 2014/0114933 A1* | 4/2014 | Chandrasekarasastry | |
| | | | G06F 12/02 |
| | | | 707/692 |
| 2015/0007183 A1* | 1/2015 | Luo | G06F 9/4806 |
| | | | 718/102 |
| 2015/0254257 A1* | 9/2015 | Kritchko | G06F 17/30575 |
| | | | 707/634 |

* cited by examiner

*Primary Examiner* — Gary Portka
(74) *Attorney, Agent, or Firm* — Schwegman Lundberg & Woessner, P.A.

(57) ABSTRACT

Various examples are directed to systems and methods for database migration. A data migration system may access schema data describing data stored at a database. The data migration system may identify a first segment of the first plurality of records having a first value for a first segmenting parameter and a second segment of the first plurality of records having a second value for the first segmenting parameter. The data migration system may begin to migrate the first segment of the first plurality of records. After the first segment of the first plurality of records is migrated, the data migration system may begin to migrate the second segment of the first plurality of records.

20 Claims, 16 Drawing Sheets

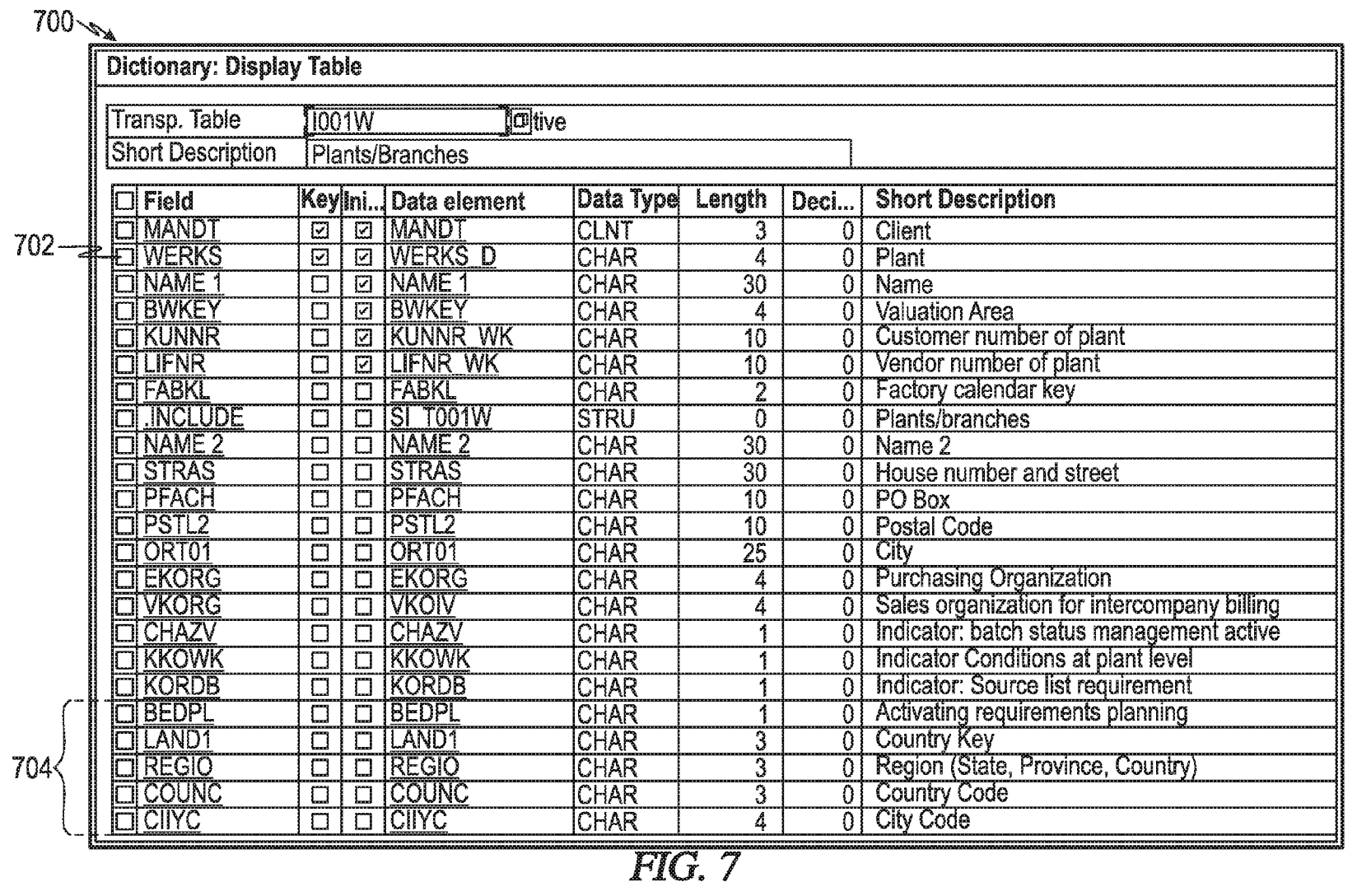

| Dictionary: Display Table | | | | | | |
|---|---|---|---|---|---|---|
| Transp. Table | T001W | | ☑ ltive | | | |
| Short Description | Plants/Branches | | | | | |

| Field | Key | Ini... | Data element | Data Type | Length | Deci... | Short Description |
|---|---|---|---|---|---|---|---|
| ☐ MANDT | ☑ | ☑ | MANDT | CLNT | 3 | 0 | Client |
| ☐ WERKS | ☑ | ☑ | WERKS_D | CHAR | 4 | 0 | Plant |
| ☐ NAME1 | ☐ | ☐ | NAME1 | CHAR | 30 | 0 | Name |
| ☐ BWKEY | ☐ | ☑ | BWKEY | CHAR | 4 | 0 | Valuation Area |
| ☐ KUNNR | ☐ | ☑ | KUNNR_WK | CHAR | 10 | 0 | Customer number of plant |
| ☐ LIFNR | ☐ | ☑ | LIFNR_WK | CHAR | 10 | 0 | Vendor number of plant |
| ☐ FABKL | ☐ | ☐ | FABKL | CHAR | 2 | 0 | Factory calendar key |
| ☐ .INCLUDE | ☐ | ☐ | ST_T001W | STRU | 0 | 0 | Plants/branches |
| ☐ NAME2 | ☐ | ☐ | NAME2 | CHAR | 30 | 0 | Name 2 |
| ☐ STRAS | ☐ | ☐ | STRAS | CHAR | 30 | 0 | House number and street |
| ☐ PFACH | ☐ | ☐ | PFACH | CHAR | 10 | 0 | PO Box |
| ☐ PSTL2 | ☐ | ☐ | PSTL2 | CHAR | 10 | 0 | Postal Code |
| ☐ ORT01 | ☐ | ☐ | ORT01 | CHAR | 25 | 0 | City |
| ☐ EKORG | ☐ | ☐ | EKORG | CHAR | 4 | 0 | Purchasing Organization |
| ☐ VKORG | ☐ | ☐ | VKOIV | CHAR | 4 | 0 | Sales organization for intercompany billing |
| ☐ CHAZV | ☐ | ☐ | CHAZV | CHAR | 1 | 0 | Indicator: batch status management active |
| ☐ KKOWK | ☐ | ☐ | KKOWK | CHAR | 1 | 0 | Indicator: Conditions at plant level |
| ☐ KORDB | ☐ | ☐ | KORDB | CHAR | 1 | 0 | Indicator: Source list requirement |
| ☐ BEDPL | ☐ | ☐ | BEDPL | CHAR | 1 | 0 | Activating requirements planning |
| ☐ LAND1 | ☐ | ☐ | LAND1 | CHAR | 3 | 0 | Country Key |
| ☐ REGIO | ☐ | ☐ | REGIO | CHAR | 3 | 0 | Region (State, Province, Country) |
| ☐ COUNC | ☐ | ☐ | COUNC | CHAR | 3 | 0 | Country Code |
| ☐ CIIYC | ☐ | ☐ | CIIYC | CHAR | 4 | 0 | City Code |

*FIG. 7*

| | Dictionary: Display Domain | |
|---|---|---|
| 802 → | Domain WERKS Active | |
| | Short Description Plant | |
| | Where-used Domain WERKS in Data Elements (339 Hits) | |
| | Data Elements | Short Description |
| | ☐ WERKSNEU | Receiving plant for new device |
| | ☐ WERKSZ | Plant at destination point |
| | ☐ WERKS_A_S | Receiving plant for Removal Reversal |
| | ☐ WERKS_B | To plant |
| 804 → | ☐ WERKS_D | Plant |
| | ☐ WERKS_DEFSBI | Default plant |
| | ☐ WERKS_D_LO | Plant - lower limit, generated |
| | ☐ WERKS_EXT | Plant (Own or External) |
| | ☐ WERKS_E_S | Receiving plant for Installation Reversal |
| | ☐ WERKS_I | Actual plant |
| | ☐ WERKS_MASK | Plant |
| | ☐ WERKS_N | New plant (mass replacement) |
| | ☐ WERKS_NABBR | Plant |
| | ☐ WERKS_PA | Plant used for reading cost estimate |
| | ☐ WERKS_PA_ACT | Plant Used for Reading Cost Estimate |
| | ☐ WERKS_PL | Planning plant |
| | ☐ WERKS_PR | Production plant |

| Where-used Data Element WERKS_D in Table Fields (1740 Hits) | |
|---|---|
| Table Fields | Short descriptn |
| /BEV1/LAAUSFALL | Shipping: Downtimes Loading Places |
| WERKS | Plant |
| /BEV1/LATERMINE | Shipping: Standard Dates Loading Places |
| WERKS | Plant |
| /BEV1/LAZEITF | Shipping: Loading Agenda |
| WERKS | Plant |
| /BEV1/LAZFSICHT | Shipping: Loading Agenda : Retain View |
| WERKS | Plant |

*FIG. 9*

| Dictionary: Display Table | | | | | | |
|---|---|---|---|---|---|---|
| Transp. Table | BEV1/LAAUSFALL ☐tive | | | | | |
| Short Description | Shipping: Downtimes Loading Places | | | | | |

| | Field | Key/ini... | Data element | Data Type | Length | Deci... | Short Description |
|---|---|---|---|---|---|---|---|
| ☐ | WERKS | ☑ | WERKS_D | CHAR | 4 | 0 | Plant |
| ☐ | GRUND | ☐ | /BEV1/LAGRUND | CHAR | 20 | 0 | Reason for Cancellation of a Loading Place |

Dictionary: Display Table

| Transp. Table | WREFA | ☐live |
|---|---|---|
| Short Description | Assigning Plants to Reference Plants | |

| ☐ | Field | Key | Ini... | Data element | Data Type | Length | Deci... | Short Description |
|---|---|---|---|---|---|---|---|---|
| ☐ | MANDT | ☑ | ☑ | MANDT | CLNT | 3 | 0 | Client |
| ☐ | GROUP_TYPE | ☑ | ☑ | W_GROUP_TYPE | CHAR | 2 | 0 | Type of Grouping for Plants to Reference Plants |
| ☐ | WERKS | ☑ | ☑ | WERKS_D | CHAR | 4 | 0 | Plant |
| ☐ | REF_WERKS | ☐ | ☐ | WERKS_REF | CHAR | 4 | 0 | Reference Plant for Logistical Processes |
| ☐ | | | | | | | | |

*FIG. 11*

SEGMENTED DATABASE MIGRATION

TECHNICAL FIELD

This document generally relates to methods and systems for use with computer networks. More particularly, this document relates to segmented data migration between databases.

BACKGROUND

Databases are used in many business settings to store large quantities of business data. On occasion, data from a database is migrated to another database or back to the source database, for example, after the original data is modified. During a data migration, data from the database is typically unavailable to client applications that utilize the database. There are various mechanisms for minimizing downtime during data migration such as, for example, the use of high-speed computing devices. As the volume of data stored in databases increases, however, these mechanisms are becoming insufficient. Also, some mechanisms for minimizing downtime are not easily compatible with certain database types. For example, some mechanisms for minimizing downtime involve creating duplicates of database tables at the source database and/or the target database. When one or both of these databases are storage constrained, however, this may be expensive. For example, one or both of the target database and the source database may be in-memory databases, such as an example of the HANA system from SAP AG of Walldorf, Germany. An in-memory database stores data primarily at main memory, such as a random access memory (RAM). This is different than databases that primarily employ a disk storage mechanism. It may be expensive and/or impractical to increase main memory at an in-memory database system to create duplicate database tables during data migration.

BRIEF DESCRIPTION OF DRAWINGS

The present disclosure is illustrated by way of example and not limitation in the following figures.

FIGS. 7-11 are matrices showing example column names for tables of an example database schema to demonstrate example segmenting parameters.

DETAILED DESCRIPTION

Figure 1:
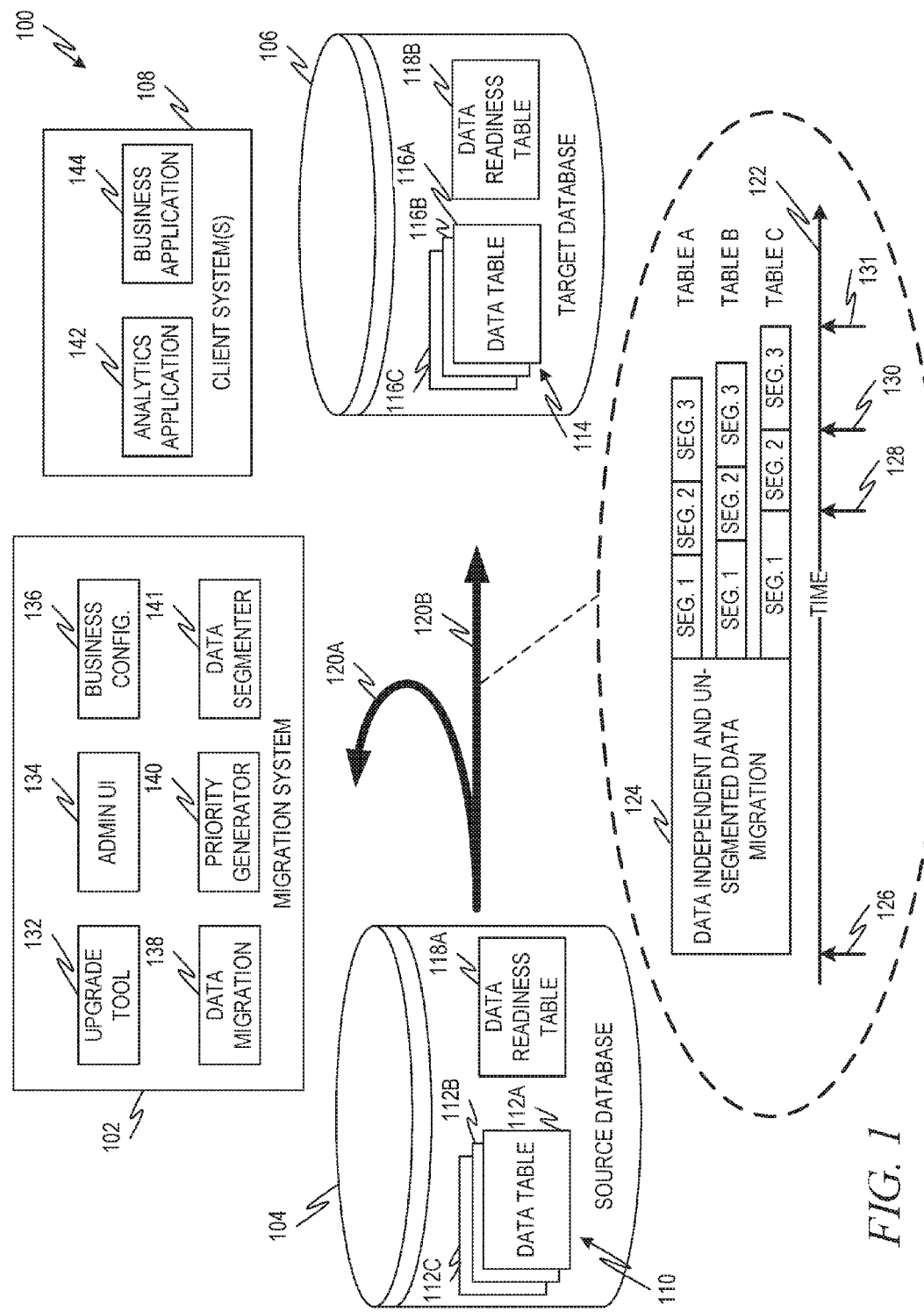
FIG. 1 is diagram showing one example of an environment for segmented data migration.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

This document generally relates to methods and systems for use with computer networks. More particularly, this document relates to segmented data migration between databases.

On occasion, it is desirable to migrate data between databases or to migrate data back to its originating database, for example, after modifying the data. For example, an enterprise may upgrade an existing database, change from one database type to another and/or switch database suppliers. During a data migration, data is typically unavailable to client applications. Time when the data is unavailable is commonly referred to as downtime. This can have real-world consequences. For example, a client application may utilize a database to operate parts of a plant, such as logistics, warehousing, etc. The client application may coordinate truck dispatching or other delivery activities. If the database is down for migration, dispatching may not occur and deliveries may be delayed, causing a loss to the enterprise. This is just one example of a negative impact from migration downtime. Various other negative impacts may occur in other implementations.

In various examples, data migration may be carried out in segments. Prior to migration, data may be segmented according to different downtime constraints. A segment may be migrated as a unit. In various examples, when migration of a segment is complete, the segment may be accessible by client applications even if the migration of other segments is not yet complete. In this way, the migration of segments may be prioritized to lessen or minimize impact.

Downtime constraints may describe limits associated with making a particular data record unavailable. One example downtime constraint is a downtime window. A downtime window may be a period of time when a data record is unneeded and/or when the demand for a data record is reduced. For example, weekends and night time hours may represent a downtime window for some data records. During a downtime window, use of a data record (e.g., by client applications) may be less than a peak usage of the data record. Another example downtime constraint is a use event. A use event is time or period of time during which a data record is needed. For example, data records related to a quarterly sales report may be required during quarterly report processing. The payroll cycle, then, may be a use event. Another example downtime constraint is an inaccessibility cost. An inaccessibility cost may describe the cost of making a data record unavailable outside of a downtime window. Inaccessibility costs may depend on various factors including, for example, the data use of the data, the profitability of the data use, contractual penalties for delayed performance, etc.

Data records may be segmented according to segmenting parameters. A segmenting parameter may be a variable describing a data record. Data records having a common value for a segmenting parameter may have the same or similar downtime constraints. An example segmenting parameter is geographic location. For example, a data segment related to a plant or other facility in Europe may have a downtime window during night time hours and holidays. Similarly, a data segment related to a plant or other facility in Mexico may have a downtime window during night time hours and holidays in Mexico. Due to time zone differences, the downtime window for the data related to the European plant may be offset from the downtime window for the plant in Mexico (e.g., the downtime window for the European plant may end first). Accordingly, the data segment related to Europe may be migrated first.

Another example segmenting parameter is data use. For example, a segment may include data records with a data use related to payroll. Payroll data may have a use event corresponding to an enterprise's periodic payroll cycle. Another example segment may include historical or closed data records used for analytics or reports. This segment may have a low inaccessibility cost, for example, because the impact of delaying analytic reports may be minimal.

Segments may include data records from a database schema of the source database. A data record may include all or part of a row from a database table. For example, a table may include a number of columns. Each column describes a type of data. A row may include a value for some or all of the columns of the table. In some examples, records may be segmented within tables of a database schema. For example, within a single database table, records may have different downtime constraints. In some examples, one or more columns of a table may indicate a segmenting variable. For example, a column of a table may indicate a plant or other facility. Records having a first value for the column (e.g., a plant in Europe) may be part of a first segment while records having a second value for the column (e.g., a plant in Mexico) may be part of a second segment.

FIG. 1 is diagram showing one example of an environment 100 for segmented data migration. The environment 100 includes a migration tool 102, a source database 104, and a target database 106. In some examples, the environment may also include one or more client systems 108.

The source database 104 may be organized according to a source database schema 110. The source database schema 110 may describe tables, columns at the tables, relationships between tables and columns, etc. In the example of FIG. 1, the source database schema comprises one or more database tables 112A, 112B, 112C. Although three database tables 112A, 112B, 112C are shown in the database schema 110, schemas in some example may include any suitable number of tables. In some examples, a database schema may include 100,000 or more tables. The target database 106 is organized according to a target database schema 114 including database tables 116A, 116B, 116C. Again, although three database tables 116A, 116B, 116C are shown in the target database schema 114, any suitable number of database tables may be included in the target database schema 114.

In some examples, the source database schema 110 and/or target database schema 114 may also include a data readiness table 118A, 118B. The data readiness tables 118A, 118B may include readiness data for segments indicating segments that have been migrated. A data readiness table 118A, 118B may be implemented at the database to which data is being migrated. For example, when data is migrated from the source database 104 to the target database 106, then the data readiness table 118B may be implemented at the target database 106. When data is migrated from the source database 104 back to the source database 104, then the data readiness table 118A may be implemented at the source database 104. Although the data readiness tables 118A, 118B are described as tables, readiness data may be stored in any suitable data structure.

In some examples, the source database schema 110 and target database schema 114 may be similar and/or equivalent. For example, database tables at the source database schema 110 may have corresponding database tables at the target database schema 114. Corresponding database tables may include the same or similar data. In the example shown in FIG. 1, table 112A may correspond to table 116A, table 112B may correspond to table 116B and table 112C may correspond to table 116C. This may not always be the case. For example, the migration system 102, in some examples, may translate tables and/or records from one form at the source database 104 to another form at the target database 106.

The environment 100 also illustrates example migrations 120A, 120B of data from the source database 104. For example, an example migration 120A is from the source database 104 back to the source database 106. In some examples when migration 120A is executed, the target database 106 is omitted. Example migration 120B is between the source database 104 and the target database 106. A timeline 122 may describe the timing of either of the migrations 120A, 120B, for example, as described herein.

Migration 120A, 120B may begin at a migration start time 126. First, as shown, data independent and un-segmented data migration tasks 124 may be performed. Data independent tasks may include, for example, formatting or reformatting schema objects or artifacts and other migration task that are independent of the data to be migrated. Unsegmented data migration tasks may include migrating data from the source database 104 that are not (or cannot be) segmented. Examples of unsegmented data include master data tables, business configuration data, system runtime configuration data, etc. At the completion of the data independent and unsegmented data tasks 124, segmented data may be migrated. For example, the timeline 122 shows migration of three tables TABLE A, TABLE B, and TABLE C. In the example migration 120A from the source database 104 back to the source database 104, TABLE A represents data migrated from table 112A back to table 112A; TABLE B represents data migrated from table 112B back to table 112B; and TABLE C represents data migrated from table 112C back to table 112C. In the example 120B from the source database 104 to the target database 106, TABLE A represents data migrated from table 112A to table 116A; TABLE B represents data migrated from table 112B to table 116B; and TABLE C represents data migrated from table 112C to table 116C.

In the example of FIG. 1, the data to be migrated is divided into three example segments: SEG. 1; SEG. 2; and SEG. 3. A single table may include data records from multiple segments. For example, in FIG. 1, TABLE A includes data segments assigned to SEGS. 1, 2, and 3. Also, in some examples, a single segment may include data records from multiple tables. For example, in FIG. 1, SEG. 1 includes data records from TABLES A, B, and C. In the example of FIG. 1, each of TABLES A, B, and C include data records assigned each of SEGS. 1, 2, and 3. In some examples, however, not all tables will include data records assigned to all segments. Similarly, in some examples, not all segments will include data records from all tables.

According to the timeline 122, SEG. 1 may be migrated first. The migration of SEG. 1 may be completed at time 128. Data records from SEG. 1 may be available for use by client systems 108 at tables 116A, 116B, 116C after time 128. For example, upon completion of the migration of TABLE A, the appropriate data readiness table 118A, 118B may be updated to indicate that SEG. 1 is completed and ready for use at tables 116A, 116B, 116C. After completion of the migration of SEG. 1, the migration of SEG. 2 may begin. The migration of SEG. 2 may be completed at time 130. For example, upon completion of the migration of TABLE B, the appropriate data readiness table 118A, 118B may be updated to indicate that SEG. 2 is completed and ready for use at tables 116A, 116B, 116C. After completion of the migration of SEG. 2, the migration of SEG. 3 may begin. The migration of SEG. 3 may be completed at time 131. In the example of FIG. 1, three tables are migrated, so after completion of the migration of SEG. 3 at time 131, the migration 120A or 120B may be complete. In the example shown in FIG. 1, TABLES A, B, and C are migrated in parallel. For example, as shown, after the SEG. 1 data from TABLE A is migrated, the migration of SEG. 2 data from TABLE A is begun before the migration of SEG. 1 data from TABLES B and C is complete. In some examples, tables may be migrated sequentially. For example, SEG. 1 data from TABLES A, B, and C may be migrated before any SEG. 2 data is migrated and SEG. 2 data from TABLES A, B, and C may be migrated before any SEG. 3 data is migrated.

The migration 120A, 120B may be managed by a migration system 102. The migration system 102 may be a stand-alone system executed by one or more servers or other computing devices. Also, in some examples, the migration system 102 may a component of a database management system, for example, a database management system of the source database 104 or target database 106. An example in-memory database management system 1200 is described below in FIGS. 12-14.

The migration system 102 may comprise various subsystems for managing the migration 120A, 120B. For example, an upgrade tool 132 may be utilized to compute the target end-of-downtime for the migration 120A, 120B and for individual segments of the migration 120A, 120B. A data migration subsystem 138 may perform the migration 120A, 120B and may, in some examples, estimate a runtime for the migration 120A, 120B and/or the migration of individual segments. An administrator user interface subsystem 134 may provide a user interface to an administrator for the migration 120A, 120B. For example, the administrator user interface may receive from the administrator information for configuring the migration 120A, 120B including, for example, whether the migration is between databases 104, 106 or an in-place migration at the source database 104, segmentation variables, segment priorities, etc. A business configuration subsystem 136 may access and/or identify input parameters for segment prioritization such as, for example, payroll schedules, holiday schedules, time zones, etc. Outputs of the business configuration subsystem 136 may be provided to an administrative user via the administrative user interface subsystem 134 and/or to the priority generator subsystem 140. A data segmenter subsystem 141 may generate data segments for migration. The priority generator subsystem 140, in some examples, may prioritize segments for the migration 120.

The client system 108 shown in FIG. 1 includes an analytics client application 142 and a business client application 144. The analytics application 142 may be programmed to generate analytic outputs, for example, based on historical or closed data from one or both of the databases 104, 106. The business application 144 may deal with current or operational data. Some applications may include both business and analytic functions. Also, not all client systems 108 will execute both an analytics application 142 and a business application 144.

Figure 2:
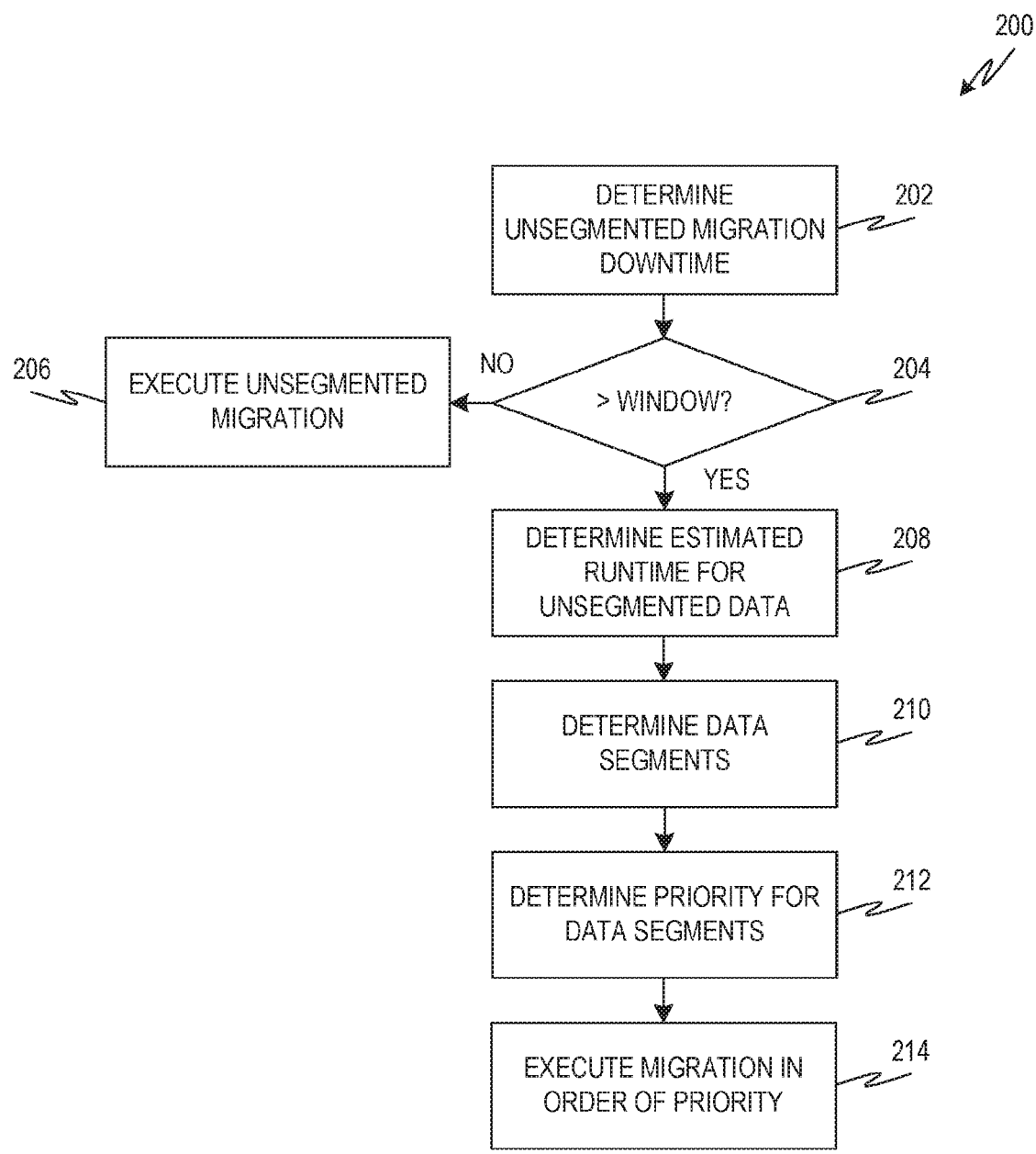
FIG. 2 is a flowchart showing one example of a process flow that may be executed by the migration system of FIG. 1 to execute a migration of data.

FIG. 2 is a flowchart showing one example of a process flow 200 that may be executed by the migration system 102 to execute a migration of data. The migration described by the process flow 200 may a migration from a source database to a target database, such as, for example, the migration 120B shown in FIG. 1, or an in-place migration from a source database back to the same source database, such as the migration 120A shown in FIG. 1. At action 202, the migration system 102 (e.g., the upgrade tool subsystem 132 thereof) may determine an unsegmented migration time. The unsegmented migration time may be the total time to migrate the data from the source database 104 to the target database 106 if no segmentation is used. At action 204, the migration system 102 may determine if the unsegmented migration time is less than a total migration window. The total migration window may be a time period during which migration downtime for all of the data to be migrated would have no impact or a small impact on the enterprise implementing the databases 104, 106. For example, the total migration window may be a time during which all or most of the data at the source database 104 is in a downtime window. If the unsegmented migration time is less than the total migration window, migration system 102 may execute an unsegmented migration at action 206.

If the unsegmented migration time is greater than the total migration window, the migration system 102 may conduct a segmented migration. For example, at action 208, the migration system 102 (e.g., the upgrade tool subsystem 132 thereof) may determine an estimated run time for data independent migration tasks and the migration of unsegmented data. At action 210, the migration system 102 may determine segments from the data to be migrated. In some examples, the segments are received from an administrative user. For example, determining the segments may include receiving data describing the segments from an administrative user via the administrative user interface subsystem 134. In some examples, the segments may be determined automatically by the data segmenter subsystem 141. In some examples, segments may be determined based on data identified and/or determined by the business configuration subsystem 136. Additional details of an example process for generating and prioritizing data segments are provided below, for example, with reference FIG. 3.

At action 212, the migration system 102 may determine a priority for the data segments determined at action 210. The priority may describe an order in which the segments will be migrated from the source database 104 to the target database 106. The priority may be determined by the priority generator 140 and/or received from an administrative user, for example, through the administrator user interface subsystem 134. In some examples, priority may be determined based on data identified and/or determined by the business configuration subsystem 136. At action 214, the migration system 102 (e.g., the data migration subsystem 138 thereof) may execute the migration. Additional details of an example process for executing the migration are provided below, for example, with reference to FIG. 4.

Figure 3:
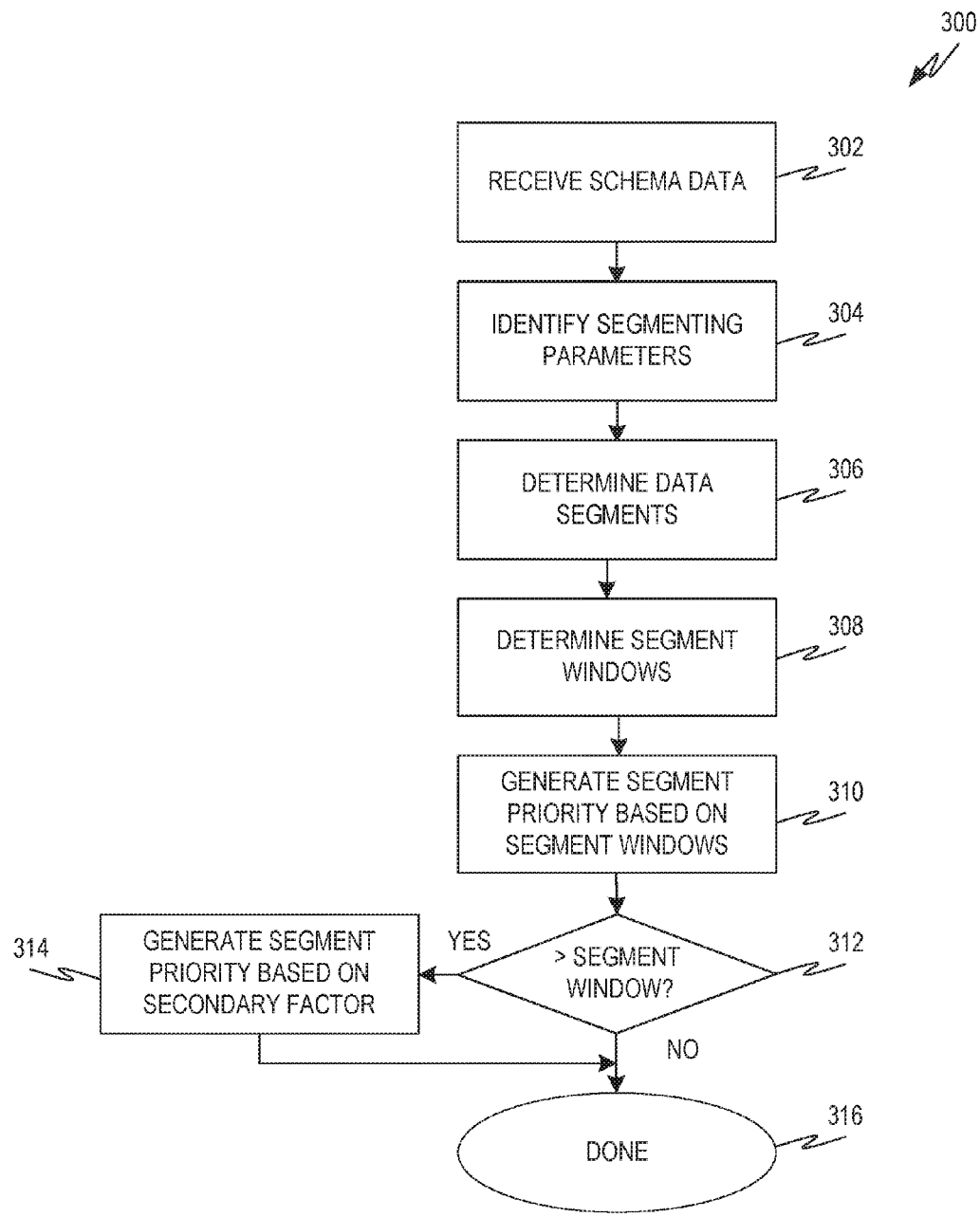
FIG. 3 is a flowchart showing one example of a process flow that may be executed by the migration system of FIG. 1 to segment and prioritize data for migration.

FIG. 3 is a flowchart showing one example of a process flow 300 that may be executed by the migration system 102 to segment and prioritize data for migration. At action 302, the migration system 102 may access schema data describing a schema of the database to be migrated. Referring to the example of FIG. 1, the accessed schema data may describe the source database schema 110 including, for example, tables included in the source database schema 110 (e.g., tables 112A, 112B, 112C) and relationships therebetween. In some examples, the schema data may also describe the target database schema 114.

At action 304, the data segmenter subsystem 141 may identify one or more segmenting parameters. Segmenting parameters may be descriptors of data that are associated with different downtime constraints, such as different downtime windows, different impacts of downtime, etc. Potential segmenting parameters may be determined, in some examples, by referring to foreign keys included on one or more of the tables 112A, 112B, 112C according to the schema data. A foreign key may be a column value in a database table that points to or otherwise refers to another table. For example, in a database table including a foreign key column, some or all of the rows in the database may have a foreign key pointing to a different database table or column of a database table. The foreign key column may be a segmenting parameter and the referred-to table or column may provide a value for the segmenting parameter.

At action 306, the migration system 102 (e.g., the data segmenter subsystem 141 thereof) may determine data segments, for example, based on the segmentation variables determined at action 302. In some examples, the segmentation variables identified at action 304 may be provided to an administrative user via the administrative user interface subsystem 134. The administrative user may select segmenting parameters. The data segmenter subsystem 141 may identify data records belonging to a particular segment. For example, when a segmenting parameter corresponds to a column of a database, a particular record may be assigned to a segment based on the value included for that record at the column. In some examples, the value may be a foreign key pointing to another table in the schema. In some examples, the data segmenter subsystem 141 may assign a data record to more than one segment. For example a particular row may belong to a geographic location segment (e.g., Europe) and to a business segment (e.g., payroll).

At action 308, the migration system 102 may determine downtime windows for the segments determined at action 306. A downtime window for a segment may indicate an available time to migrate the segment while minimizing the impact of the migration. For an example segment corresponding to a first geographic location, a downtime window may correspond to an evening, weekend, and/or holiday at the geographic location when data is not needed or where need for the data is lessened. In another example segment corresponding to a payroll data use, a downtime window may correspond to the times of the month when payroll is not being run. In some examples, determining the downtime window for a segment may involve determining whether the segment is associated with a use event. For example, if an enterprise runs a payroll process on a weekend, a downtime window for a data segment that includes payroll data may exclude the weekend when the payroll process is rune.

At action 310, the migration system 102 (e.g., the priority generator subsystem 140) may generate a priority for the segments determined at action 308. For example, the priority generator subsystem 140 may select a migration start time and schedule the data independent and unsegmented data migration to occur first. Migration for the segments identified at action 308 may then be scheduled in an order that completes the migration of as many segments as possible during downtime windows for those segments. In some examples, the priority for the segments may be determined based at least in part on estimated runtimes for segment migrations. For example, upgrade tool subsystem 132 may estimate a runtime for the data independent tasks and migration of unsegmented data. The priority generator subsystem 140 may utilize the estimates of the migration times to stack the segment migrations and determine an optimal priority/ordering.

The upgrade tool subsystem 132 may estimate the runtime for a migration in any suitable manner. In some examples, the data migration subsystem may consider the number or rows in a segment, a complexity of the conversion from the source schema to the target schema, and a type of hardware performing the migration (e.g., a number of cores). In some examples, the data migration subsystem 138 may initiate a migration of a portion of a segment to measure a migration rate.

In some examples where a segment is associated with a use event, the priority generator subsystem 140 may determine a scheduled time for the use event. If the scheduled time for the use event is after the migration is to have completed, the segment may be assigned lower priority. In some examples, segment priority may be determined by an administrative user. For example, the migration system 102 may provide the segments and segment windows to the administrative user via the administrative user interface subsystem 134. The administrative user may provide a priority for the segments.

At action 312, the migration system 102 may determine whether migration of any of the segments falls outside of the downtime window for that segment. In some examples, a segment migration may be considered to fall outside of the segment's downtime window if the time at which migration for the segment ends (e.g., an estimated completion time for the segment's migration) is outside of the downtime window. In some examples, a segment migration may be considered to fall outside of the segment's downtime window if the time at which the migration for the segment ends is outside of the downtime window by more than a threshold time (e.g., 30 minutes). If no segment migration falls outside of a segment downtime window, segmentation and prioritization of the segments may be done at action 316 (e.g., the migration system 102 may proceed to execute the migration with the segment priority determined at action 310).

If one or more segment migrations fall outside of their associated segment downtime window, the migration system 102 (e.g., the priority generator subsystem 140) may generate a new segment priority at action 314 considering a secondary factor. A secondary factor, for example, may indicate the impact of migrating a segment outside of a downtime window, for example, considering an inaccessibility cost for the segment. For example, the priority generator subsystem 140 may determine an inaccessibility cost for some or all of the segments. The priority generated and/or accessed at action 314 may select segments that are migrated partially or wholly outside of a downtime window for the segment to reduce or minimize the impact. For example, segments with lower inaccessibility costs may be migrated outside of their downtime windows.

An example secondary factor is a contract associated with a segment. For example, different contracts may have different grace periods and/or penalties for non-compliance. Accordingly the impact of inaccessibility for a data segment associated with a first contract may be different than the impact of inaccessibility for a data segment associated with a second contract. Another example of a secondary factor may be the profit associated with a segment. For example, if a first plant in a first geographic area associated with a first segment is performing a highly profitable business activity while a second plant in a second geographic area associated with a second segment is performing a less profitable business activity, the migration system 102 may prioritize a segment associated with the first plant higher than a segment associated with the second plant. In some examples, the migration system 102 (e.g., the administrative user interface subsystem 134) may provide segments and potential secondary factors to an administrative user. The migration system 102 may access the prioritization based on the secondary factors from the administrative user. The prioritization task may complete at action 316. For example, the migration system 102 may proceed to conduct a migration according to the segment priority determined at action 314.

Figure 4:
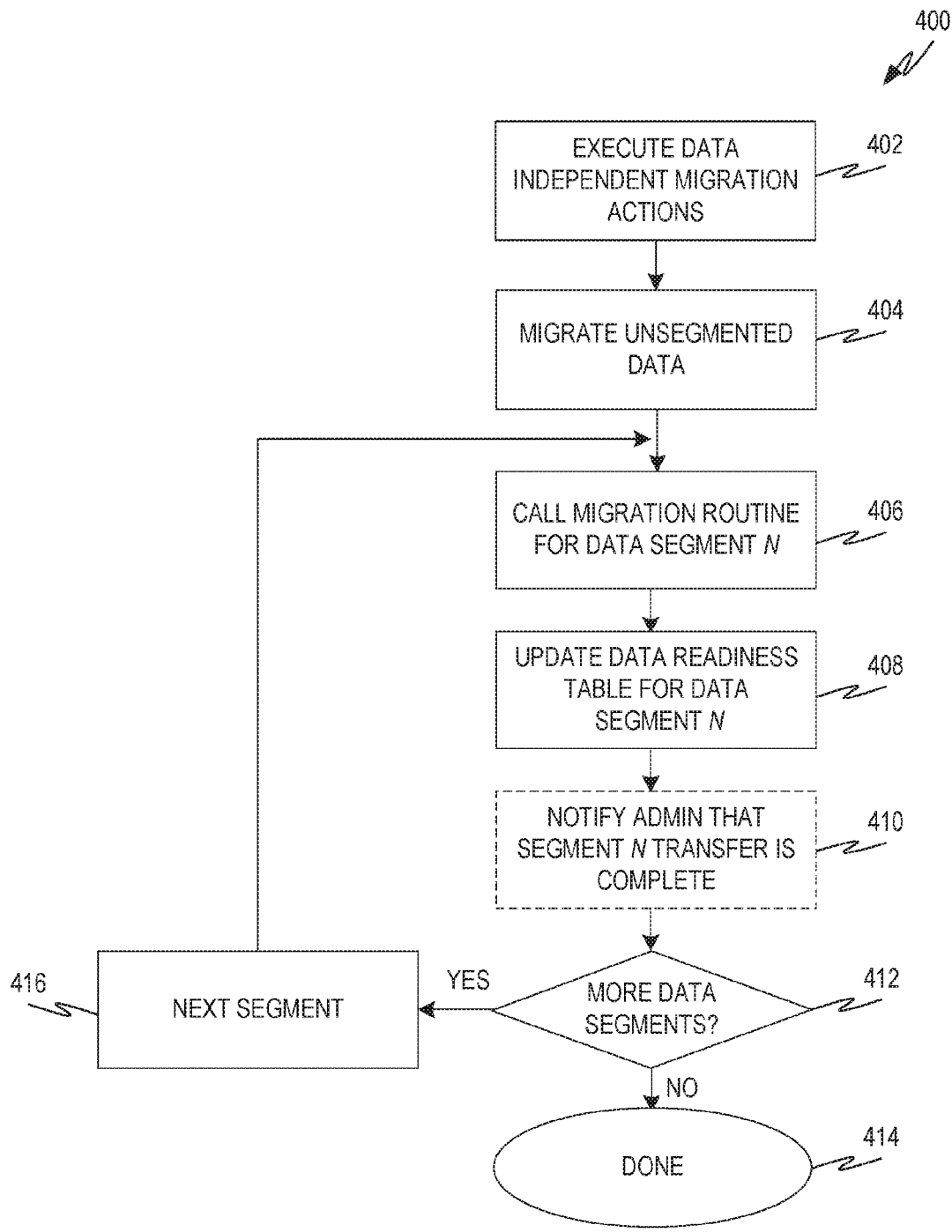
FIG. 4 is a flowchart showing one example of a process flow that may be executed by the migration system of FIG. 1 to migrate segmented data.

FIG. 4 is a flowchart showing one example of a process flow 400 that may be executed by the migration system 102 (e.g., the data migration subsystem 138) to migrate segmented data. The migration illustrated by the process flow 400 may be a migration, such as migration 120B, from a source database to a target database or may be an in-place migration. The process flow 400 may access data describing segments (e.g., determined as described herein), a segment priority (e.g., determined as described herein), and a migration start time. At the migration start time, the data migration subsystem 138 may begin executing data-independent migration actions at action 402. Data-independent migration actions may be parts of the migration that do not directly involve moving data from the source database to the target database. For example, data-independent migration actions may include configuring the schema of the target database to match the schema of the source database, initializing the target database, modifying the schema of the source database and/or making other changes to the source database, etc. In some examples, some or all data-independent migration actions may be performed while user systems still have full access to the source database. Accordingly, these actions may be performed before the migration start time.

At action 404, the data migration subsystem 138 may migrate unsegmented data from the source database to the target database. Unsegmented data may be data that is not assigned to a particular segment. For example, unsegmented data may include rows from database tables that do not have a value for the selected segmentation variable or variables (e.g., do not have a foreign key associated with a value for the segmentation variable). Examples of unsegmented data may include, for example, master data tables, configuration data relevant across segmentation variable values, etc.

At action 406, the data migration subsystem 138 may begin migrating a first segment (e.g., the highest priority segment). For example, the data migration subsystem 138 may call a migration subroutine with respect to the selected segment. In some examples, the data migration subsystem 138 may migrate data segments from the first segment sequentially. For example, the data migration subsystem 138 may migrate first segment data records from a first table. When all data records at the first table that are from the first segment are migrated, the data migration subsystem 138 may move to a second table and migrate data records from the second table that are part of the first segment. This may continue until all data records of the first segment are migrated.

When migration of the first segment is complete, the data migration subsystem 138 may, at action 408, update a data readiness table (e.g., table 118) at the target database, for example, by writing readiness data for the first segment to the data readiness table. Readiness data for a segment may indicate that migration of the segment is complete. For example, client applications, such as 142, 144, may be permitted to access portions of the completed data segment at the target database even though the migration may not yet be complete.

At optional action 410, the database migration subsystem 138 may notify an administrative user that migration of the segment is complete. For example, the database migration subsystem 138 and/or the administrative user interface subsystem 134 may send a message to one or more administrative users, for example, via e-mail and/or via an administrative user interface. At action 412, the database migration subsystem 138 may determine whether any additional data segments remain. If not, the migration may be complete at action 414. If yes, then the data migration subsystem 138 may move to the next segment on the priority list at action 416 and return to action 406 as described above.

The process flow 400 describes a migration process that is sequential across the source database 104. For example, as described, the database migration subsystem 138 migrates all of one segment across all tables of the source database, then migrates all of a next segment across all tables of the source database, and so on. In some examples, the process flow 400 may be executed on a table-by-table basis. For example, the database migration subsystem 104 may migrate all of one segment at a first table, then migrate all of a next segment across the first table, and so on. Other tables of the source database may be migrated in a similar manner either in series or in parallel with the migration of the first table.

Figure 5:
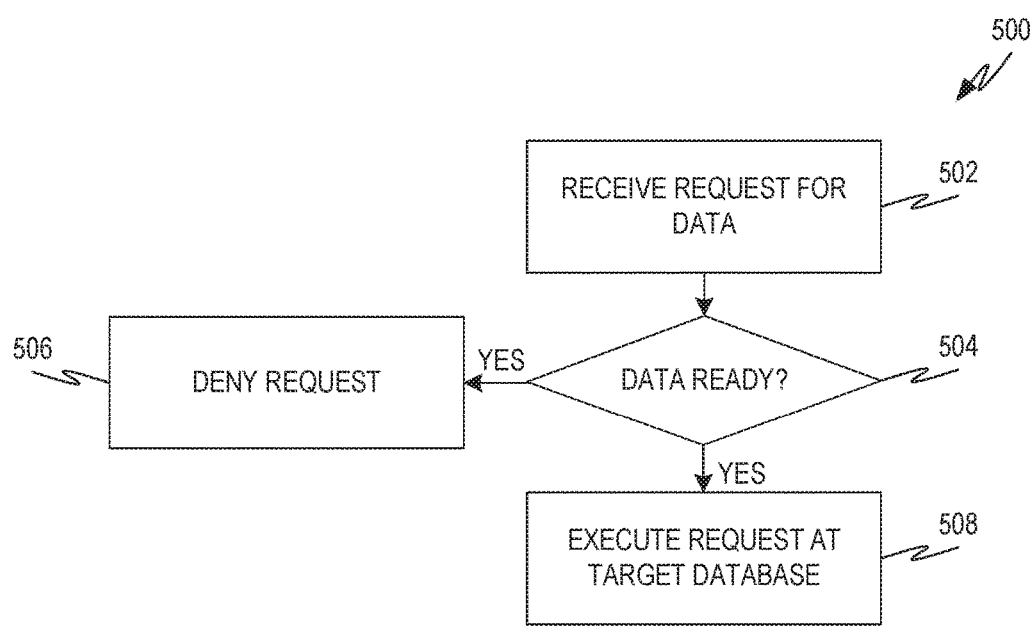
FIG. 5 is a flowchart showing one example of a process flow that may be executed, for example, by a database management system to respond to a database request from a client application during a segmented data migration.

FIG. 5 is a flowchart showing one example of a process flow 500 that may be executed, for example, by a database management system to respond to a database request from a client application during a segmented data migration (an example database management system is described herein at FIG. 12-15.) In a migration from a source database to a target database, the process flow 500 may be executed by the database management system of the target database. In an in-place migration at a source database, the process flow 500 may be executed at a database management system of the source database.

At action 502, the database management system may access a database request from a client application (such as one of the applications 142, 144 described herein). At action 504, the database management system may determine whether data requested by the database request for read or write purposes is ready. For example, the database management system may consult the data readiness table 118A, 118B. If the data readiness table 118A, 118B includes readiness data for all the assigned data segments of all data requested at the database request, the database management system may determine that the requested data is ready. If any data requested by the database request is included in a data segment that is not ready, then the database management system may deny the request at action 506. If all of the data requested by the database request is ready, the database management system may execute the database request at action 508 and, for example, send results to the requesting client application. In some examples, the database management system may partially execute the request, for example, if some requested data is ready and other requested data is not.

Figure 6:
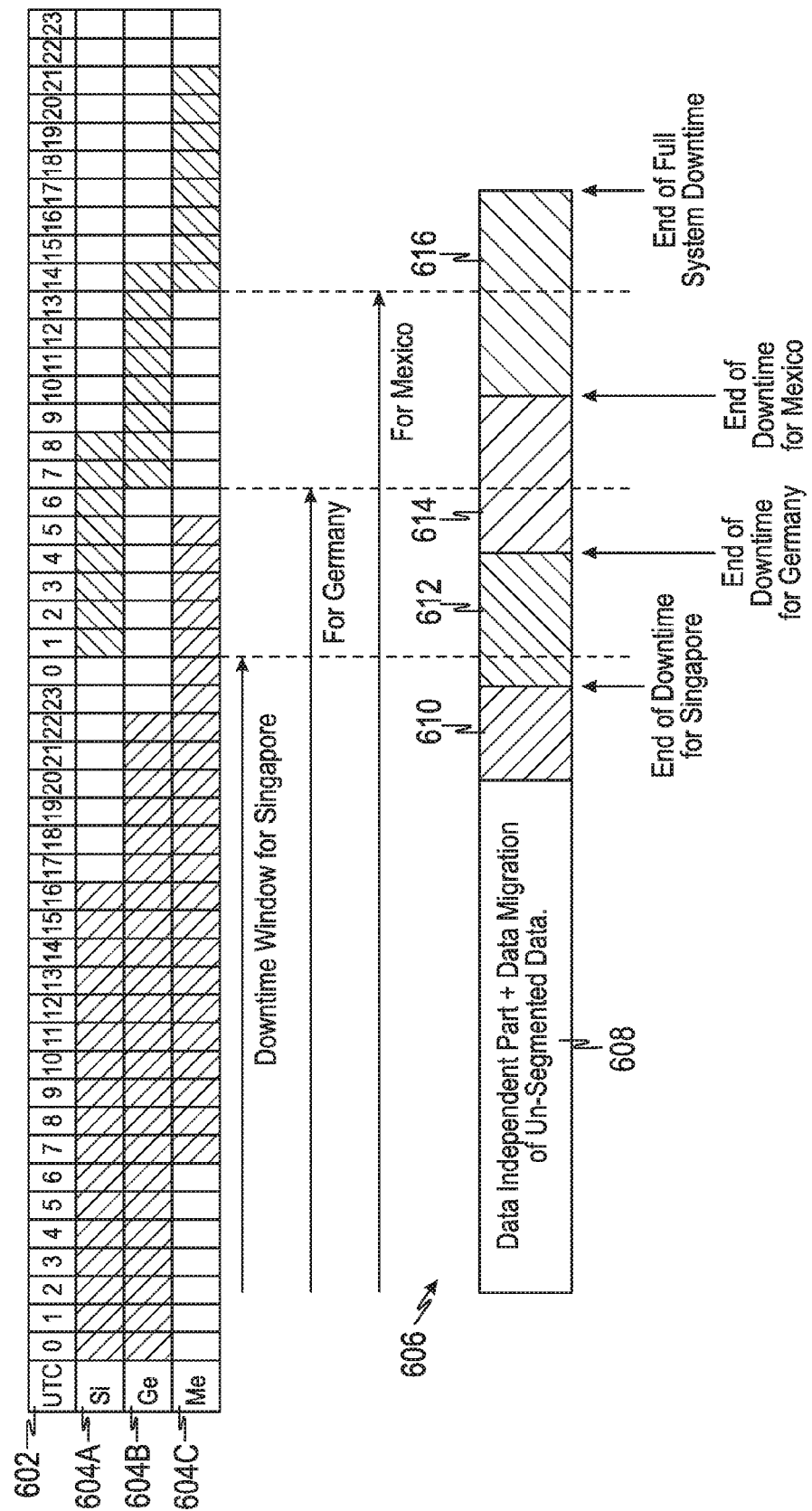
FIG. 6 is a diagram illustrating one example of a segmented data migration.

FIG. 6 is a diagram illustrating one example of a segmented data migration. FIG. 6 includes a timeline 602 showing hours according to universal coordinated time (UTC). For example, on the time line, the first "0" on the left corresponds to midnight on a Sunday, UTC. Three rows 604A, 604B, 604C beneath the timeline 602 indicate downtime windows for Singapore (604A), Germany (604B), and Mexico (604C). For example, Singapore may be UTC plus seven, Germany may be UTC plus one, and Mexico may be UTC minus 6. The Monday shift at all three geographic locations may extend from 8:00 to sixteen 16:00 local time. In Singapore, the Monday shift may begin at 1:00 UTC. Accordingly, a downtime window for Singapore may extend until 1:00 UTC. The Monday shift in Germany may begin at 7:00 UTC, meaning that a downtime window for Germany for may also extend until 1:00 UTC. Similarly, the Monday shift in Mexico may begin at 14:00 UTC, meaning that a downtime window for Mexico may also extend until 14:00 UTC.

A segmented data migration timeline 606 shows a data migration from a source database to a target database. In the timeline 606, data is segmented according to four segments, with the segmenting parameter being a geographic location. In a first segment, the segmenting parameter is equal to Singapore. In a second segment, the segmenting parameter is equal to Germany. In a third segment, the segmenting parameter is equal to Mexico. In a fourth segment, the value of the segmenting parameter is not illustrated.

At time period 608, the migration system may perform data independent tasks and migrate unsegmented data. At time period 610, after 608, the migration system may begin to migrate data in the first data segment having the segmenting parameter equal to Singapore. In the example of FIG. 6, the migration of the first segment data concludes at the "End of downtime for Singapore." As illustrated, this occurs before the end of the downtime window for Singapore. At time period 612, the migration system may begin to migrate data in the second segment having the segmenting parameter equal to Germany. In the example of FIG. 6, the migration of the second segment data concludes at the "End of downtime for Germany." As illustrated, this occurs before the end of the downtime window for Germany.

At time period 614, the migration system may begin to migrate data in the third segment having the segmenting parameter equal to Mexico. In the example of FIG. 6, the migration of the second segment data concludes at the "End of downtime for Mexico." As illustrated, this occurs before the end of the downtime window for Mexico. At time period 616, the migration system may begin to migrate data in a fourth segment. The fourth segment, for example, may include data that has another value of the segmenting parameter. Also, in some examples, the fourth segment may include data that is segmenting according to another segmenting parameter having a different downtime window. For example, the fourth segment may include payroll data, analytic data, or other data that is not immediately needed. A scheduled end of the migration is indicated by the "End of full system downtime."

FIGS. 7-11 are matrices showing example column names for tables of an example database schema to demonstrate example segmenting parameters. FIG. 7 shows an example of a master table 700 for the example database schema. A row 702 shows a "werks" or plant data item that indicates a plant. For example, other tables of the database schema may include foreign key referencing the master database and a particular value for "werks" or plants. The master table 700 also includes rows 704 including address information that may indicate the address (e.g., geographic location) of one or more plants or "werks" indicated by row 702.

FIG. 8 shows a matrix with a field 802 indicating a top-level domain for the variable "werks" in the example database schema. A field 804 shows example data elements that can use the domain "werks." For example, the data elements listed in field 804 may be contained in records having a foreign key pointing to a value of "werks" or plant at the master database, which when "werks" or plant is sued as a segmenting parameter may provide a value for the segmenting parameter. FIG. 9 shows an example of a matrix 900 illustrating example table fields or columns utilizing the data element WERK_D, which is an indication of a plant. FIG. 10 shows an example table LAASFALL 1000 having a column called WERKS that references the master table to provide a value for a plant related to the other columns of the table. FIG. 11 shows a similar example table WREFA.

Figure 12:
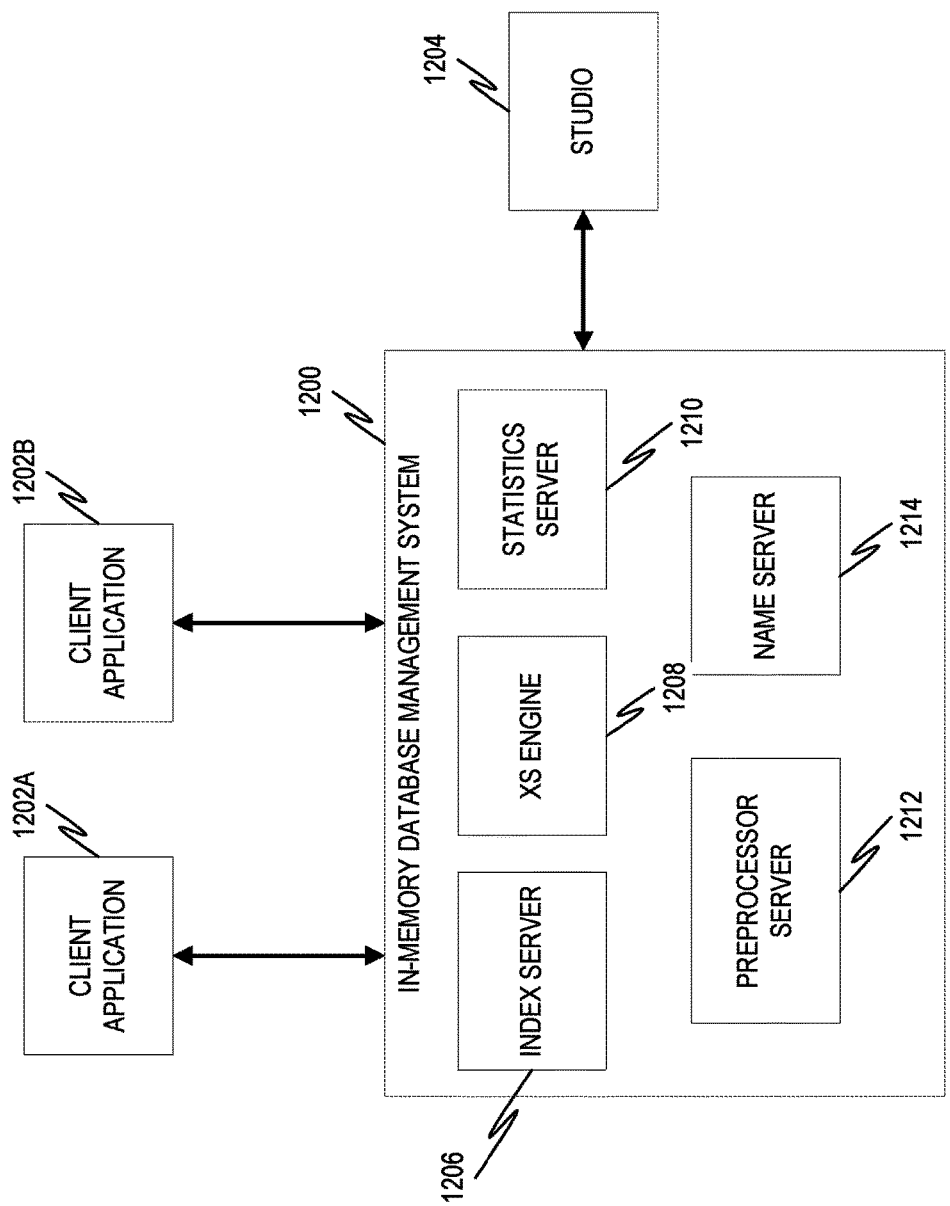
FIG. 12 is a diagram illustrating an example of in-memory database management system.

FIG. 12 is a diagram illustrating an example of in-memory database management system 1200. For example, the database management system 1200 may manage the target database and/or the source database of a segmented data migration, as described herein. The in-memory database management system 1200 may be coupled to one or more client applications 1202A, 1202B. The client applications 1202A, 1202B may perform one or more functions utilizing data from the database including, for example, presenting a user interface (UI) to one or more users, etc. The client applications 1202A, 1202B may communicate with the in-memory database management system 1200 through a number of different protocols, including Structured Query Language (SQL), Multidimensional Expressions (MDX), Hypertext Transfer Protocol (HTTP), Representational State Transfer (REST), Hypertext Markup Language (HTML).

FIG. 12 also shows a studio 1204 that may be used to perform modeling by accessing the in-memory database management system 1200. In some examples, the studio 1204 can allow complex analysis to be performed on data drawn not only from real time event data and windows, but also from stored database information.

The in-memory database management system 1200 may comprise a number of different components, including an index server 1206, an XS engine 1208, a statistics server 1210, a preprocessor server 1212, and a name server 1214. These components may operate on a single computing device, or may be spread among multiple computing devices (e.g., separate servers). The index server 1206 contains the actual data and the engines for processing the data. It may also coordinate and uses the other servers.

The XS engine 1208 allows clients to connect to the in-memory database management system 1200 using web protocols, such as Hypertext Transfer Protocol (HTTP).

The statistics server 1210 collects information about status, performance, and resource consumption from all the other server components. The statistics server 1210 can be accessed from the studio 1204 to obtain the status of various alert monitors.

The preprocessor server 1212 is used for analyzing text data and extracting the information on which the text search capabilities are based.

The name server 1214 holds information about the database topology. This is used in a distributed system with instances of the database on different hosts. The name server 1214 knows where the components are running and which data is located on which server. In an example embodiment, a separate enqueue server may operate in the manner described above with respect to enqueue servers, specifically with regard to creating and managing lightweight enqueue sessions.

Figure 13:
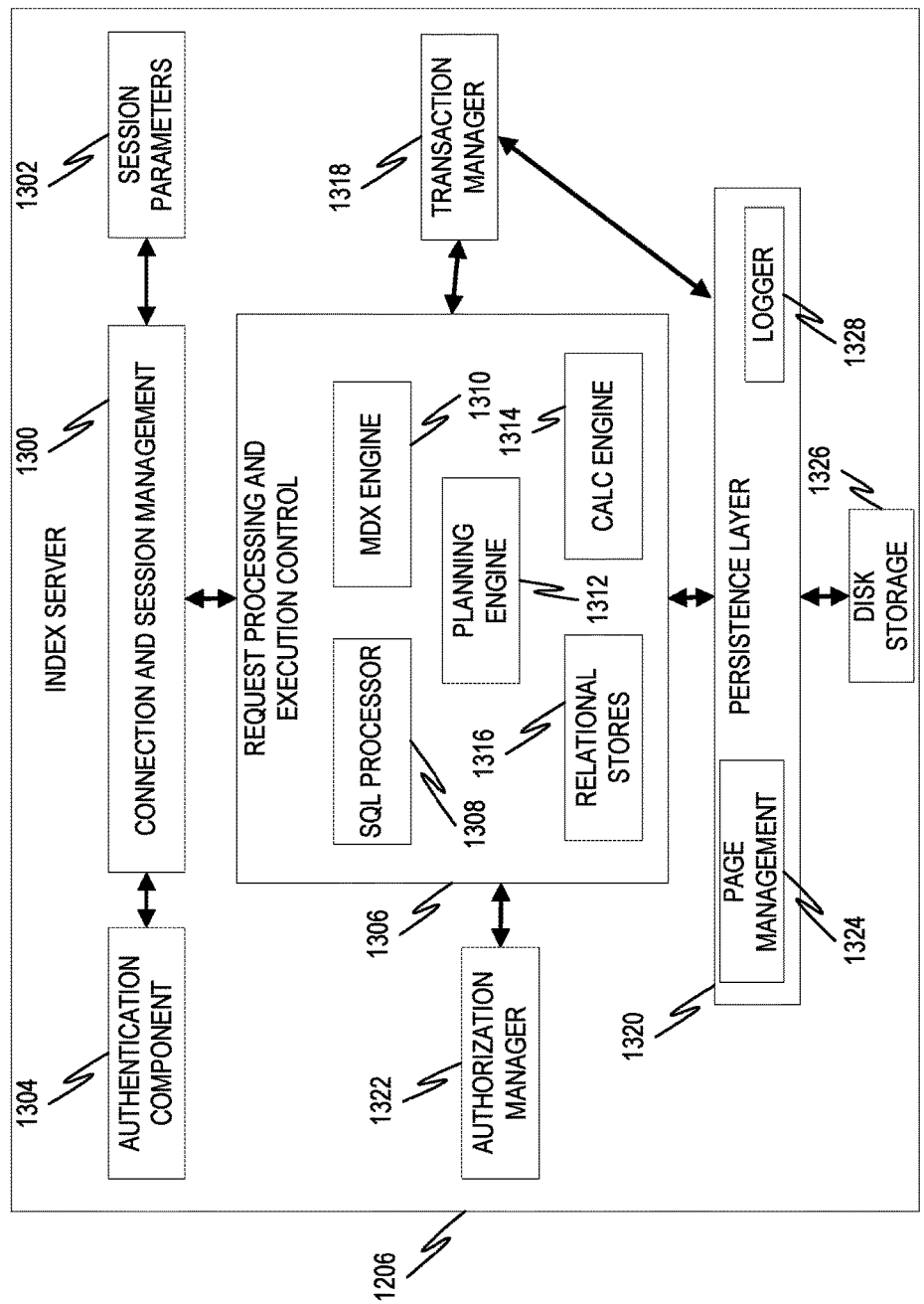
FIG. 13 is a diagram illustrating an example of the index server.

FIG. 13 is a diagram illustrating an example of the index server 1206. Specifically, the index server 1206 of FIG. 12 is depicted in more detail. The index server 1206 includes a connection and session management component 1300, which is responsible for creating and managing sessions and connections for the database clients. Once a session is established, clients can communicate with the database system using SQL statements. For each session, a set of session parameters 1302 may be maintained, such as autocommit, current transaction isolation level, etc. Users (e.g., system administrators, developers) may be authenticated by the database system itself (e.g., by logging in with user name and password, using an authentication component 1304) or authentication can be delegated to an external authentication provider such as a Lightweight Directory Access Protocol (LDAP) directory.

The client requests can be analyzed and executed by a set of components summarized as request processing and execution control 1306. An SQL processor 1308 checks the syntax and semantics of the client SQL statements and generates a logical execution plan. Multidimensional expressions (MDX) is a language for querying and manipulating multidimensional data stored in OLAP cubes. As such, an MDX engine 1310 is provided to allow for the parsing and executing of MDX commands. A planning engine 1312 allows applications (e.g., financial planning applications) to execute basic planning operations in the database layer. One such operation is to create a new version of a dataset as a copy of an existing dataset, while applying filters and transformations.

A calculation engine 1314 implements the various SQL script and planning operations. The calculation engine 1314 creates a logical execution plan for calculation models derived from SQL script, MDX, planning, and domain-specific models. This logical execution plan may include, for example, breaking up a model into operations that can be processed in parallel. The data is stored in relational stores 1316, which implement a relational database in main memory. Each SQL statement may be processed in the context of a transaction. New sessions are implicitly assigned to a new transaction. A transaction manager 1318 coordinates database transactions, controls transactional isolation, and keeps track of running and closed transactions. When a transaction is committed or rolled back, the transaction manager 1318 informs the involved engines about this event so they can execute needed actions. The transaction manager 1318 also cooperates with a persistence layer 1320 to achieve atomic and durable transactions.

An authorization manager 1322 is invoked by other database system components to check whether the user has the specified privileges to execute the requested operations. The database system allows for the granting of privileges to users or roles. A privilege grants the right to perform a specified operation on a specified object.

The persistence layer 1320 ensures that the database is restored to the most recent committed state after a restart and that transactions are either completely executed or completely undone. To achieve this goal in an efficient way, the persistence layer 1320 uses a combination of write-ahead logs, shadow paging, and save points. The persistence layer 1320 also offers a page management interface 1324 for writing and reading data to a separate disk storage 1326, and also contains a logger 1328 that manages the transaction log. Log entries can be written implicitly by the persistence layer 1320 when data is written via the persistence interface or explicitly by using a log interface.

Figure 14:
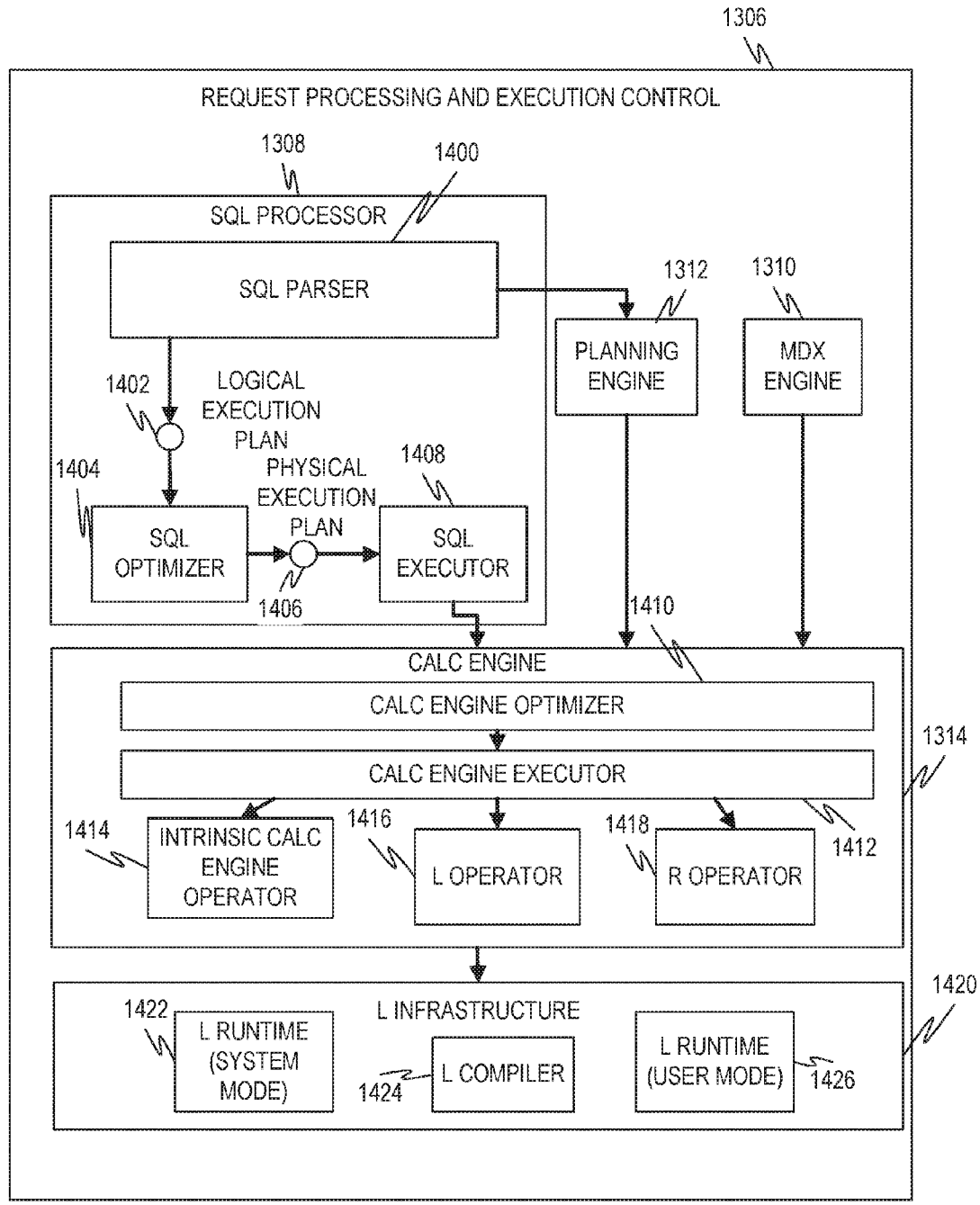
FIG. 14 is a diagram illustrating one example of the request processing and execution control.

FIG. 14 is a diagram illustrating one example of the request processing and execution control 1306. This diagram depicts the request processing and execution control 1306 of FIG. 13 in more detail. The SQL processor 1308 contains an SQL parser 1400, which parses the SQL statement and generates a logical execution plan 1402, which it passes to an SQL optimizer 1404. The SQL optimizer 1404 then optimizes the logical execution plan 1402 and converts it to a physical execution plan 1406, which it then passes to an SQL executor 1408. The calculation engine 1314 implements the various SQL script and planning operations, and includes a calc engine optimizer 1410, which optimizes the operations, and a calc engine executor 1412, which executes the operations, as well as an intrinsic calc engine operator 1414, an L operator 1416, and an R operator 1418.

An L infrastructure 1420 includes a number of components to aid in the running of L procedures, including an L-runtime (system mode) 1422, an L compiler 1424, and an L-runtime (User mode) 1426.

Figure 15:
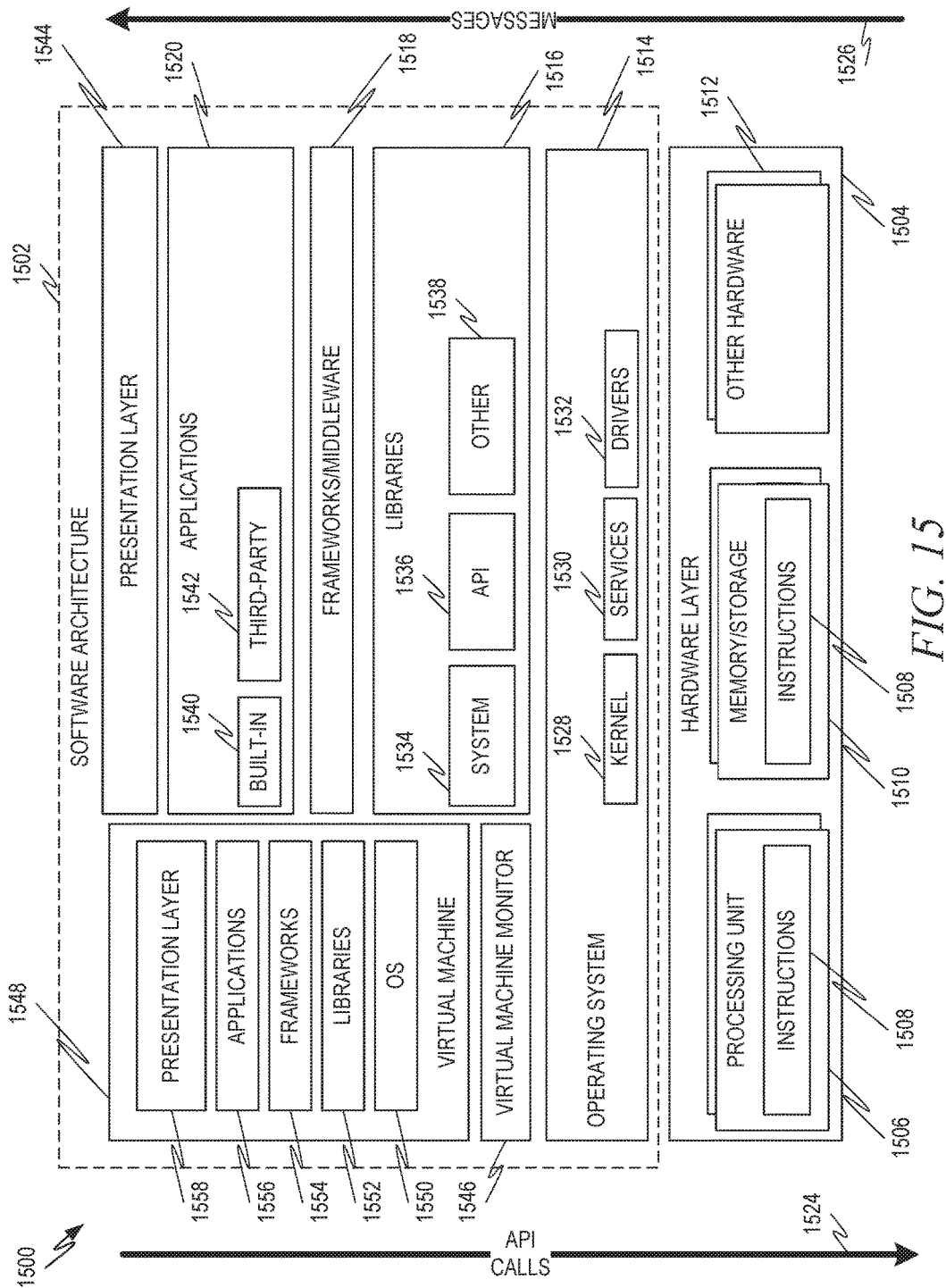
FIG. 15 is a block diagram showing one example of a software architecture for a computing device.

FIG. 15 is a block diagram 1500 showing one example of a software architecture 1502 for a computing device. The architecture 1502 may be used in conjunction with various hardware architectures, for example, as described herein. FIG. 15 is merely a non-limiting example of a software architecture and many other architectures may be implemented to facilitate the functionality described herein. A representative hardware layer 1504 is illustrated and can represent, for example, any of the above referenced computing devices. In some examples, the hardware layer 1504 may be implemented according to the architecture of the computer system 1600 of FIG. 16.

The representative hardware layer 1504 comprises one or more processing units 1506 having associated executable instructions 1508. Executable instructions 1508 represent the executable instructions of the software architecture 1502, including implementation of the methods, modules, subsystems, and components, and so forth described herein and may also include memory and/or storage modules 1510, which also have executable instructions 1508. Hardware layer 1504 may also comprise other hardware as indicated by other hardware 1512 which represents any other hardware of the hardware layer 1504, such as the other hardware illustrated as part of computer system 1600.

In the example architecture of FIG. 15, the software architecture 1502 may be conceptualized as a stack of layers where each layer provides particular functionality. For example, the software architecture 1502 may include layers such as an operating system 1514, libraries 1516, frameworks/middleware 1518, applications 1520 and presentation layer 1544. Operationally, the applications 1520 and/or other components within the layers may invoke application programming interface (API) calls 1524 through the software stack and access a response, returned values, and so forth illustrated as messages 1526 in response to the API calls 1524. The layers illustrated are representative in nature and not all software architectures have all layers. For example, some mobile or special purpose operating systems may not provide a frameworks/middleware layer 1518, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. In some examples, the services 1530 include an interrupt service. The interrupt service may detect the receipt of an interrupt and, in response, cause the architecture 1502 to pause its current processing and execute an interrupt service routine (ISR) when an interrupt is accessed.

The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi®, drivers, NFC drivers, audio drivers, power management drivers, and so forth depending on the hardware configuration.

The libraries 1516 may provide a common infrastructure that may be utilized by the applications 1520 and/or other components and/or layers. The libraries 1516 typically provide functionality that allows other software modules to perform tasks in an easier fashion than to interface directly with the underlying operating system 1514 functionality (e.g., kernel 1528, services 1530 and/or drivers 1532). The libraries 1516 may include system 1534 libraries (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks 1518 (also sometimes referred to as middleware) may provide a higher-level common infrastructure that may be utilized by the applications 1520 and/or other software components/modules. For example, the frameworks 1518 may provide various graphic user interface (GUI) functions, high-level resource management, high-level location services, and so forth. The frameworks 1518 may provide a broad spectrum of other APIs that may be utilized by the applications 1520 and/or other software components/modules, some of which may be specific to a particular operating system or platform.

The applications 1520 includes built-in applications 1540 and/or third party applications 1542. Examples of representative built-in applications 1540 may include, but are not limited to, a contacts application, a browser application, a book reader application, a location application, a media application, a messaging application, and/or a game application. Third party applications 1542 may include any of the built in applications as well as a broad assortment of other applications. In a specific example, the third party application 1542 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 1542 may invoke the API calls 1524 provided by the mobile operating system such as operating system 1514 to facilitate functionality described herein.

The applications 1520 may utilize built in operating system functions (e.g., kernel 1528, services 1530 and/or drivers 1532), libraries (e.g., system 1534, APIs 1536, and other libraries 1538), frameworks/middleware 1518 to create user interfaces to interact with users of the system. Alternatively, or additionally, in some systems interactions with a user may occur through a presentation layer, such as presentation layer 1544. In these systems, the application/module "logic" can be separated from the aspects of the application/module that interact with a user.

Some software architectures utilize virtual machines. In the example of FIG. 15, this is illustrated by virtual machine 1548. A virtual machine creates a software environment where applications/modules can execute as if they were executing on a hardware computing device. A virtual machine is hosted by a host operating system (operating system 1514) and typically, although not always, has a virtual machine monitor 1546, which manages the operation of the virtual machine as well as the interface with the host operating system (i.e., operating system 1514). A software architecture executes within the virtual machine such as an operating system 1550, libraries 1552, frameworks/middleware 1554, applications 1556 and/or presentation layer 1558. These layers of software architecture executing within the virtual machine 1548 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 16:
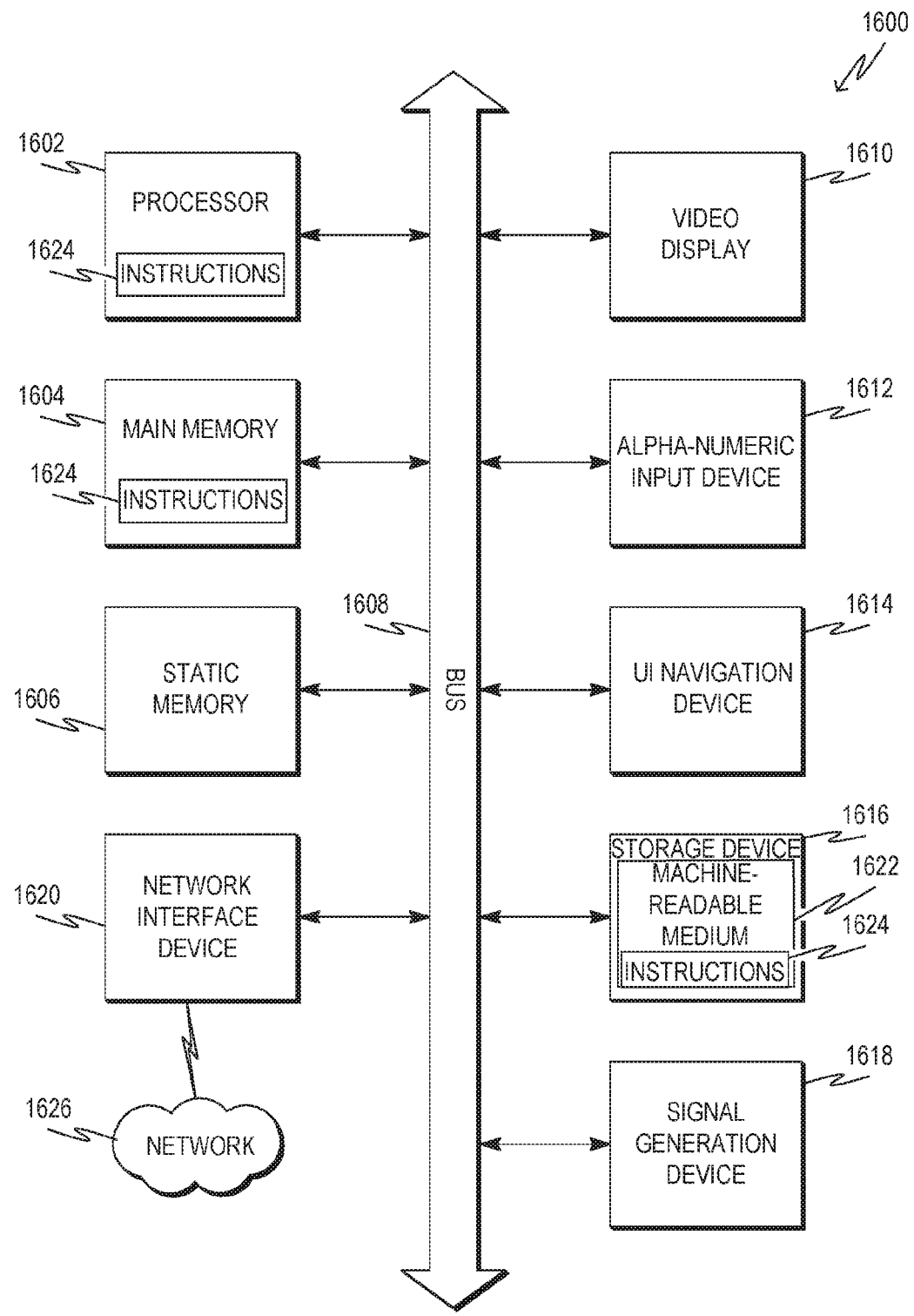
FIG. 16 is a block diagram of a machine in the example form of a computer system within which instructions may be executed for causing the machine to perform any one or more of the methodologies discussed herein.

FIG. 16 is a block diagram of a machine in the example form of a computer system 1600 within which instructions 1624 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU), or both), a main memory 1604, and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard or a touch-sensitive display screen), a user interface (UI) navigation (or cursor control) device 1614 (e.g., a mouse), a disk drive unit 1616, a signal generation device 1618 (e.g., a speaker), and a network interface device 1620.

Machine-Readable Medium

The disk drive unit 1616 includes a machine-readable medium 1622 on which is stored one or more sets of data structures and instructions 1624 (e.g., software) embodying or utilized by any one or more of the methodologies or functions described herein. The instructions 1624 may also reside, completely or at least partially, within the main memory 1604 and/or within the processor 1602 during execution thereof by the computer system 1600, with the main memory 1604 and the processor 1602 also constituting machine-readable media 1622.

While the machine-readable medium 1622 is shown in an example embodiment to be a single medium, the term "machine-readable medium" may include a single medium or multiple media (e.g., a centralized or distributed database, and/or associated caches and servers) that store the one or more instructions 1624 or data structures. The term "machine-readable medium" shall also be taken to include any tangible medium that is capable of storing, encoding, or carrying instructions 1624 for execution by the machine and that cause the machine to perform any one or more of the methodologies of the present disclosure, or that is capable of storing, encoding, or carrying data structures utilized by or associated with such instructions 1624. The term "machine-readable medium" shall accordingly be taken to include, but not be limited to, solid-state memories, and optical and magnetic media. Specific examples of machine-readable media 1622 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1624 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

Example 1 is a migration system, comprising: at least one processor and a memory in communication with the at least one processor, wherein the at least one processor is programmed to: access schema data describing data stored at a first database, wherein the schema data describes a first table of the first database, and wherein the first table comprises a first plurality of records; segment the first plurality of records to determine a first segment of the first plurality of records having a first value for a first segmenting parameter and a second segment of the first plurality of records having a second value for the first segmenting parameter; begin to migrate the first segment of the first plurality of records; and after the first segment of the first plurality of records is migrated, begin to migrate the second segment of the first plurality of records.

In Example 2, the subject matter of Example 1 optionally includes wherein the at least one processor is further programmed to, before identifying the first segment of the first plurality of records, determine that a runtime for migrating the data.

In Example 3, the subject matter of any one or more of Examples 1-2 optionally include wherein the schema data also describes a second table of the first database, and wherein the second table comprises a second plurality of records, wherein the at least one processor is further programmed to: segment the second plurality of records to determine a first segment of the second plurality of records having the first value for the first segmenting parameter; and before beginning to migrate the second segment of the first plurality of records, begin to migrate the first segment of the second plurality of records.

In Example 4, the subject matter of any one or more of Examples 1-3 optionally include wherein the at least one processor is further programmed to: access first downtime data describing a first downtime window associated with the first value of the first segmenting parameter; access second downtime data describing a second downtime window associated with the second value of the first segmenting parameter; and determine a priority for the first segment and the second segment based at least in part on the first downtime window and the second downtime window.

In Example 5, the subject matter of any one or more of Examples 1-4 optionally include wherein the at least one processor is further programmed to: access first downtime data describing a first downtime window associated with the first value of the first segmenting parameter; access second downtime data describing a second downtime window associated with the second value of the first segmenting parameter, and determine that a migration end time for the second segment is after the second downtime window; and determine that an inaccessibility cost of the first segment is greater than an inaccessibility cost of the second segment.

In Example 6, the subject matter of any one or more of Examples 1-5 optionally include wherein the schema data also describes a second table of the first database, and wherein the second table comprises a second plurality of records, wherein the at least one processor is further programmed to: segment the second plurality of records to determine a first segment of the second plurality of records having the first value for the first segmenting parameter and a second segment of the second plurality of records having the second value for the first segmenting parameter; begin to migrate the first segment of the second plurality of records; and before beginning to migrate the second segment of the first plurality of records, begin to migrate the second segment of the second plurality of records.

Example 7 is a method, comprising: accessing schema data describing data stored at a database, wherein the schema data describes a first table of the database, and wherein the first table comprises a first plurality of records; determining that a first segment of the first plurality of records is associated with a first geographic location; determining that a second segment of the first plurality of records is associated with a second geographic location; accessing first downtime window data for the first geographic location, the first downtime window data describing a first downtime window during which usage of the first segment is less than a peak usage of the first segment; accessing second downtime window data for the second geographic location, the second downtime window data describing a second downtime window during which usage of the second segment is less than a peak usage of the second segment, and wherein an end of the first downtime window is before an end of the second downtime window; beginning to migrate the first segment of the first plurality of records; and after the first segment of the first plurality of records is migrated, beginning to migrate the second segment of the first plurality of records.

In Example 8, the subject matter of Example 7 optionally includes wherein the schema data also describes a second table from the database, wherein the second table comprises a second plurality of records, and further comprising: determining that a first segment of the second plurality of records is associated with the first geographic location; determining that a second segment of the second plurality of records is associated with the second geographic location; and before beginning to migrate the second segment of the first plurality of records of first table, beginning to migrate the first segment of the second plurality of records.

In Example 9, the subject matter of any one or more of Examples 7-8 optionally include determining that a third segment of the first plurality of records of the plurality of records is associated with a first use event; determining that a scheduled time for the first use event is after an estimated completion of migration of data; and after the second segment of the first plurality of records is migrated, beginning to migrate the third segment of the first plurality of records.

In Example 10, the subject matter of any one or more of Examples 7-9 optionally include determining that a third segment of the first plurality of records is associated with a third geographic location; accessing third downtime window data for the third geographic location, the third downtime window data describing a third downtime window during which usage of the third segment is less than a peak usage of the third segment; determining an estimated completion time for migrating the third segment of the first plurality of records when the third segment of the first plurality of records is migrated after the second segment of the first plurality of records is migrated; determining that the estimated completion time for migrating the third segment of the first plurality of records is after the end of the third downtime window; determining that an inaccessibility cost for the third segment of the first plurality of records is greater than an inaccessibility cost for the second segment of the first plurality of records; and before beginning to migrate the second segment of the first plurality of records, beginning to migrate the third segment of the first plurality of records.

In Example 11, the subject matter of any one or more of Examples 7-10 optionally include determining that migration of the first segment of the first plurality of records is complete; and writing first readiness data to a data readiness data structure, the first readiness data indicating that the first segment of the first plurality of records is ready for access.

In Example 12, the subject matter of Example 11 optionally includes receiving from a client application a request for a first record of the first segment of the first plurality of records; determining that the data readiness data structure includes the first readiness data indicating that migration of the first segment of the first plurality of records is complete; obtaining a copy of first record; and sending the copy of the first record to the client application.

In Example 13, the subject matter of any one or more of Examples 7-12 optionally include determining an estimated completion time for migration of the data; and before determining that the first segment of the first plurality of records is associated with the first geographic location, determining that the estimated completion time is after the end of the first downtime window.

In Example 14, the subject matter of any one or more of Examples 7-13 optionally include determining an estimated runtime for migrating an unsegmented portion of the data; determining a first estimated runtime for migrating the first segment of the first plurality of records; determining a second estimated runtime for migrating the second segment of the first plurality of records; and selecting the first segment of the first plurality of records to be migrated before the second segment of the first plurality of records based at least in part on the first estimated runtime.

Example 15 is a machine-readable medium having instructions thereon that, when executed by at least one processor, cause the at least one processor to: access schema data describing data stored at a database, wherein the schema data describes a first table of the database, and wherein the first table comprises a first plurality of records; determine that a first segment of the first plurality of records is associated with a first geographic location; determine that a second segment of the first plurality of records is associated with a second geographic location; access first downtime window data for the first geographic location, the first downtime window data describing a first downtime window during which usage of the first segment is less than a peak usage of the first segment; access second downtime window data for the second geographic location, the second downtime window data describing a second downtime window during which usage of the second segment is less than a peak usage of the second segment, and wherein an end of the first downtime window is before an end of the second downtime window; begin to migrate the first segment of the first plurality of records during the first downtime window; and after the first segment of the first plurality of records is migrated, begin to migrate the second segment of the first plurality of records.

In Example 16, the subject matter of Example 15 optionally includes wherein the schema data also describes a second table from the database, wherein the second table comprises a second plurality of records, and wherein the medium further comprises instructions thereon that, when executed by at least one processor, cause the at least one processor to: determine that a first segment of the second plurality of records is associated with the first geographic location; determine that a second segment of the second plurality of records is associated with the second geographic location; and before beginning to migrate the second segment of the first plurality of records, beginning to migrate the first segment of the second plurality of records.

In Example 17, the subject matter of any one or more of Examples 15-16 optionally include wherein the medium further comprises instructions thereon that, when executed by at least one processor, cause the at least one processor to: determine that a third segment of the first plurality of records of the plurality of records is associated with a first use event; determine that a scheduled time for the first use event is after an estimated completion of migration; and after the second segment of the first plurality of records is migrated, beginning to migrate the third segment of the first plurality of records.

In Example 18, the subject matter of any one or more of Examples 15-17 optionally include wherein the medium further comprises instructions thereon that, when executed by at least one processor, cause the at least one processor to: determine that a third segment of the first plurality of records is associated with a third geographic location; accessing third downtime window data for the third geographic location, the third downtime window data describing a third downtime window during which usage of the third segment is less than a peak usage of the third segment; determine an estimated completion time for migrating the third segment of the first plurality of records when the third segment of the first plurality of records is migrated after the second segment of the first plurality of records is migrated; determine that the estimated completion time for migrating the third segment of the first plurality of records is after the end of the third downtime window; determine that an inaccessibility cost for the third segment of the first plurality of records is greater than an inaccessibility cost for the second segment of the first plurality of records; and before beginning to migrate the second segment of the first plurality of records, begin to migrate the third segment of the first plurality of records.

In Example 19, the subject matter of any one or more of Examples 15-18 optionally include wherein the medium further comprises instructions thereon that, when executed by at least one processor, cause the at least one processor to: determining that migration of the first segment of the first plurality of records is complete; and writing first readiness data to a data readiness data structure, the first readiness data indicating that the first segment of the first plurality of records is ready for access.

In Example 20, the subject matter of Example 19 optionally includes wherein the medium further comprises instructions thereon that, when executed by at least one processor, cause the at least one processor to: access from a client application a request for a first record of the first segment of the first plurality of records; determine that the data readiness data structure includes the first readiness data indicating that migration of the first segment of the first plurality of records is complete; obtain a copy of first record; and send the copy of the first record to the client application.

What is claimed is:

1. A migration system, comprising:
at least one processor and a memory in communication with the at least one processor, wherein the at least one processor is programmed to perform operations comprising:
accessing schema data describing data stored at a first database, wherein the schema data describes a first table of the first database, and wherein the first table comprises a first plurality of records;
segmenting the first plurality of records to determine a first segment of the first plurality of records having a first value for a first segmenting parameter and a second segment of the first plurality of records having a second value for the first segmenting parameter;
determining to migrate the first segment of the first plurality of records before the second segment of the plurality of records based at least in part on at least one of a first downtime constraint associated with the first value for the first segmenting parameter or a second downtime constraint associated with the second value for the first segmenting parameter;
beginning to migrate the first segment of the first plurality of records; and
after beginning to migrate the first segment of the first plurality of records, beginning to migrate the second segment of the first plurality of records.

2. The migration system of claim 1, wherein the at least one processor is further programmed to perform operations comprising, before identifying the first segment of the first plurality of records, determining a runtime for migrating the data.

3. The migration system of claim 1, wherein the schema data also describes a second table of the first database, and wherein the second table comprises a second plurality of records, wherein the at least one processor is further programmed to perform operations comprising:
segmenting the second plurality of records to determine a first segment of the second plurality of records having the first value for the first segmenting parameter; and
before beginning to migrate the second segment of the first plurality of records, beginning to migrate the first segment of the second plurality of records.

4. The migration system of claim 1, wherein the at least one processor is further programmed to perform operations comprising:
accessing first downtime data describing a first downtime window associated with the first value of the first segmenting parameter;
accessing second downtime data describing a second downtime window associated with the second value of the first segmenting parameter, and determining a priority for the first segment and the second segment based at least in part on the first downtime window and the second downtime window.

5. The migration system of claim 1, wherein the at least one processor is further programmed to perform operations comprising:
accessing first downtime data describing a first downtime window associated with the first value of the first segmenting parameter;
accessing second downtime data describing a second downtime window associated with the second value of the first segmenting parameter, and
determining that a migration end time for the second segment is after the second downtime window, and
determining that an inaccessibility cost of the first segment is greater than an inaccessibility cost of the second segment.

6. The migration system of claim 1, wherein the schema data also describes a second table of the first database, and wherein the second table comprises a second plurality of records, wherein the at least one processor is further programmed to perform operations comprising:
segmenting the second plurality of records to determine a first segment of the second plurality of records having the first value for the first segmenting parameter and a second segment of the second plurality of records having the second value for the first segmenting parameter;
beginning to migrate the first segment of the second plurality of records; and
before beginning to migrate the second segment of the first plurality of records, beginning to migrate the second segment of the second plurality of records.

7. A method, comprising:
accessing, at a database management system, schema data describing data stored at a database, wherein the schema data describes a first table of the database, and wherein the first table comprises a first plurality of records;
determining, using one or more hardware processors of the database management system, that a first segment of the first plurality of records is associated with a first geographic location;
determining that a second segment of the first plurality of records is associated with a second geographic location;
accessing first downtime window data for the first geographic location, the first downtime window data describing a first downtime window during which usage of the first segment is less than a peak usage of the first segment;
accessing second downtime window data for the second geographic location, the second downtime window data describing a second downtime window during which usage of the second segment is less than a peak usage of the second segment, and wherein an end of the first downtime window is before an end of the second downtime window;
beginning to migrate the first segment of the first plurality of records; and
after the first segment of the first plurality of records is migrated, beginning to migrate the second segment of the first plurality of records.

8. The method of claim 7, wherein the schema data also describes a second table from the database, wherein the second table comprises a second plurality of records, and further comprising:
determining that a first segment of the second plurality of records is associated with the first geographic location;
determining that a second segment of the second plurality of records is associated with the second geographic location; and
before beginning to migrate the second segment of the first plurality of records of first table, beginning to migrate the first segment of the second plurality of records.

9. The method of claim 7, further comprising:
determining that a third segment of the first plurality of records of the plurality of records is associated with a first use event;
determining that a scheduled time for the first use event is after an estimated completion of migration of data; and
after the second segment of the first plurality of records is migrated, beginning to migrate the third segment of the first plurality of records.

10. The method of claim 7, further comprising:
determining that a third segment of the first plurality of records is associated with a third geographic location;
accessing third downtime window data for the third geographic location, the third downtime window data describing a third downtime window during which usage of the third segment is less than a peak usage of the third segment;
determining an estimated completion time for migrating the third segment of the first plurality of records when the third segment of the first plurality of records is migrated after the second segment of the first plurality of records is migrated;
determining that the estimated completion time for migrating the third segment of the first plurality of records is after the end of the third downtime window;
determining that an inaccessibility cost for the third segment of the first plurality of records is greater than an inaccessibility cost for the second segment of the first plurality of records; and before beginning to migrate the second segment of the first plurality of records, beginning to migrate the third segment of the first plurality of records.

11. The method of claim 7, further comprising:
determining that migration of the first segment of the first plurality of records is complete; and
writing first readiness data to a data readiness data structure, the first readiness data indicating that the first segment of the first plurality of records is ready for access.

12. The method of claim 1, further comprising:
receiving from a client application a request for a first record of the first segment of the first plurality of records;
determining that the data readiness data structure includes the first readiness data indicating that migration of the first segment of the first plurality of records is complete;
obtaining a copy of first record; and
sending the copy of the first record to the client application.

13. The method of claim 7, further comprising:
determining an estimated completion time for migration of the data; and
before determining that the first segment of the first plurality of records is associated with the first geographic location, determining that the estimated completion time is after the end of the first downtime window.

14. The method of claim 7, further comprising:
determining an estimated runtime for migrating an unsegmented portion of the data;
determining a first estimated runtime for migrating the first segment of the first plurality of records;
determining a second estimated runtime for migrating the second segment of the first plurality of records; and
selecting the first segment of the first plurality of records to be migrated before the second segment of the first plurality of records based at least in part on the first estimated runtime.

15. A machine-readable medium having instructions thereon that, when executed by at least one processor, cause the at least one processor to perform operations comprising:
accessing schema data describing data stored at a database, wherein the schema data describes a first table of the database, and wherein the first table comprises a first plurality of records;
determining that a first segment of the first plurality of records is associated with a first geographic location;
determining that a second segment of the first plurality of records is associated with a second geographic location;
accessing first downtime window data for the first geographic location, the first downtime window data describing a first downtime window during which usage of the first segment is less than a peak usage of the first segment;
accessing second downtime window data for the second geographic location, the second downtime window data describing a second downtime window during which usage of the second segment is less than a peak usage of the second segment, and wherein an end of the first downtime window is before an end of the second downtime window;
beginning to migrate the first segment of the first plurality of records during the first downtime window; and
after the first segment of the first plurality of records is migrated, beginning to migrate the second segment of the first plurality of records.

16. The medium of claim 15, wherein the schema data also describes a second table from the database, wherein the second table comprises a second plurality of records, and wherein the medium further comprises instructions thereon that, when executed by at least one processor, cause the at least one processor to perform operations comprising:
determining that a first segment of the second plurality of records is associated with the first geographic location;
determining that a second segment of the second plurality of records is associated with the second geographic location; and
before beginning to migrate the second segment of the first plurality of records, beginning to migrate the first segment of the second plurality of records.

17. The medium of claim 15, wherein the medium further comprises instructions thereon that, when executed by at least one processor, cause the at least one processor to perform operations comprising:
determining that a third segment of the first plurality of records of the plurality of records is associated with a first use event;
determining that a scheduled time for the first use event is after an estimated completion of migration; and
after the second segment of the first plurality of records is migrated, beginning to migrate the third segment of the first plurality of records.

18. The medium of claim 15, wherein the medium further comprises instructions thereon that, when executed by at least one processor, cause the at least one processor to perform operations comprising:
determining that a third segment of the first plurality of records is associated with a third geographic location;
accessing third downtime window data for the third geographic location, the third downtime window data describing a third downtime window during which usage of the third segment is less than a peak usage of the third segment;
determining an estimated completion time for migrating the third segment of the first plurality of records when the third segment of the first plurality of records is migrated after the second segment of the first plurality of records is migrated;
determining that the estimated completion time for migrating the third segment of the first plurality of records is after the end of the third downtime window;
determining that an inaccessibility cost for the third segment of the first plurality of records is greater than an inaccessibility cost for the second segment of the first plurality of records; and
before beginning to migrate the second segment of the first plurality of records, beginning to migrate the third segment of the first plurality of records.

19. The medium of claim 15, wherein the medium further comprises instructions thereon that, when executed by at least one processor, cause the at least one processor to perform operations comprising:
determining that migration of the first segment of the first plurality of records is complete; and
writing first readiness data to a data readiness data structure, the first readiness data indicating that the first segment of the first plurality of records is ready for access.

20. The medium of claim 19, wherein the medium further comprises instructions thereon that, when executed by at least one processor, cause the at least one processor to perform operations comprising:
accessing from a client application a request for a first record of the first segment of the first plurality of records;
determining that the data readiness data structure includes the first readiness data indicating that migration of the first segment of the first plurality of records is complete;
obtaining a copy of first record; and
sending the copy of the first record to the client application.

* * * * *